US012693389B2

(12) United States Patent
Shimada et al.

(10) Patent No.: US 12,693,389 B2
(45) Date of Patent: Jul. 28, 2026

(54) LIGHT DETECTION DEVICE AND METHOD FOR DRIVING PHOTOSENSOR

(71) Applicant: HAMAMATSU PHOTONICS K.K., Hamamatsu (JP)

(72) Inventors: Akihiro Shimada, Hamamatsu (JP); Mitsuhito Mase, Hamamatsu (JP); Jun Hiramitsu, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 1085 days.

(21) Appl. No.: 17/783,685

(22) PCT Filed: Nov. 16, 2020

(86) PCT No.: PCT/JP2020/042671
§ 371 (c)(1),
(2) Date: Jun. 9, 2022

(87) PCT Pub. No.: WO2021/131397
PCT Pub. Date: Jul. 1, 2021

(65) Prior Publication Data
US 2023/0035346 A1 Feb. 2, 2023

(30) Foreign Application Priority Data
Dec. 26, 2019 (JP) ................................. 2019-236239

(51) Int. Cl.
*G01S 7/486* (2020.01)
*G01S 7/4863* (2020.01)
(Continued)

(52) U.S. Cl.
CPC ............ *G01S 7/4863* (2013.01); *G01S 17/89* (2013.01); *H04N 25/771* (2023.01);
(Continued)

(58) Field of Classification Search
CPC ...... G01S 7/4863; G01S 17/89; G01S 7/4816; G01S 7/4914; G01S 17/894; G01S 17/36;
(Continued)

(56) References Cited

U.S. PATENT DOCUMENTS

2010/0187401 A1 7/2010 Kawahito
2019/0331775 A1* 10/2019 Song ..................... G01S 7/4816

FOREIGN PATENT DOCUMENTS

CN 101784911 A 7/2010
CN 102208422 A 10/2011
(Continued)

OTHER PUBLICATIONS

JP2009047662 translation (Year: 2009).*
International Preliminary Report on Patentability mailed Jul. 7, 2022 for PCT/JP2020/042671.

*Primary Examiner* — Tony Ko
(74) *Attorney, Agent, or Firm* — FAEGRE DRINKER BIDDLE & REATH LLP

(57) ABSTRACT

In a light detection device, a control unit performs a first charge transfer process for transferring charge generated in a charge generation region to a charge storage region by applying an electric potential to a transfer gate electrode so that a potential energy of a region immediately below the transfer gate electrode is lower than a potential energy of the charge generation region and a first read process for reading an amount of charge stored in the charge storage region. In the first charge transfer process, the control unit applies an electric potential to an overflow gate electrode so that a potential energy of a region immediately below the overflow gate electrode is lower than the potential energy of the charge generation region.

9 Claims, 18 Drawing Sheets

(51) Int. Cl.

| | | |
|---|---|---|
| *G01S 17/89* | (2020.01) | |
| *H04N 25/771* | (2023.01) | |
| *H04N 25/78* | (2023.01) | |
| *H04N 25/532* | (2023.01) | |
| *H04N 25/705* | (2023.01) | |

(52) U.S. Cl.
CPC ........... *H04N 25/78* (2023.01); *H04N 25/532* (2023.01); *H04N 25/705* (2023.01)

(58) Field of Classification Search
CPC .... H04N 25/771; H04N 25/78; H04N 25/532; H04N 25/705; H04N 25/75
See application file for complete search history.

(56) References Cited

FOREIGN PATENT DOCUMENTS

| | | | | | |
|---|---|---|---|---|---|
| CN | 102209206 | A | 10/2011 | | |
| CN | 102833495 | A | 12/2012 | | |
| CN | 103329271 | A | 9/2013 | | |
| CN | 106233157 | A | 12/2016 | | |
| CN | 107533128 | A | 1/2018 | | |
| JP | H05-95101 | A | 4/1993 | | |
| JP | 2009047662 | A * | 3/2009 | ........... | H04N 25/771 |
| JP | 2011-133464 | A | 7/2011 | | |
| JP | 2016-206135 | A | 12/2016 | | |
| KR | 20070004782 | A | 1/2007 | | |
| KR | 20170140304 | A | 12/2017 | | |
| WO | WO-2005/083790 | A1 | 9/2005 | | |
| WO | WO-2018/216400 | A1 | 11/2018 | | |

* cited by examiner (a)

(b)

(c)

(d)

LIGHT DETECTION DEVICE AND METHOD FOR DRIVING PHOTOSENSOR

TECHNICAL FIELD

An aspect of the present disclosure relates to a light detection device including a photosensor and a method for driving a photosensor.

BACKGROUND ART

Patent Literature 1 describes a photosensor including a photodiode for generating charge in response to incident light, a floating region for storing the charge from the photodiode, and a storage capacity element for storing the charge overflowing from the floating region.

CITATION LIST

Patent Literature

Patent Literature 1: International Publication WO 2005/083790

SUMMARY OF INVENTION

Technical Problem

In the photosensor described in Patent Literature 1, the charge overflowing from the floating region can be stored in the storage capacity element. However, when the charge is stored in the floating region to the extent that the charge overflows to the storage capacity element, a part of the charge remains in the photodiode. In this case, the light detection accuracy may be reduced due to the charge remaining in the photodiode. In particular, if the above situation occurs when the photosensor has a gating function of detecting only the light that arrives at a predetermined timing instead of detecting light over the entire period, the charge remaining in the photodiode in one period is read as charge generated in another period, and accordingly, it may not be possible to accurately detect the amount of charge generated at a predetermined timing.

It is an object of an aspect of the present disclosure to provide a light detection device and a method for driving a photosensor that can improve the detection accuracy.

Solution to Problem

A light detection device according to an aspect of the present disclosure includes: a photosensor; and a control unit that controls the photosensor. The photosensor includes a charge generation region that generates charge in response to incident light, a charge storage region, an overflow region, a transfer gate electrode arranged on a region between the charge generation region and the charge storage region, and an overflow gate electrode arranged on a region between the charge storage region and the overflow region. The control unit performs a first charge transfer process, which is for transferring charge generated in the charge generation region to the charge storage region by applying an electric potential to the transfer gate electrode so that a potential energy of a region immediately below the transfer gate electrode is lower than a potential energy of the charge generation region, and a first read process, which is for reading an amount of charge stored in the charge storage region after the first charge transfer process. In the first charge transfer process, an electric potential is applied to the overflow gate electrode so that a potential energy of a region immediately below the overflow gate electrode is lower than the potential energy of the charge generation region.

In the light detection device, the photosensor includes the overflow region and the overflow gate electrode disposed on the region between the charge storage region and the overflow region. Therefore, since the charge overflowing from the charge storage region can be stored in the overflow region, it is possible to suppress the saturation of the storage capacity. In addition, during the execution of the first charge transfer process for transferring the charge generated in the charge generation region to the charge storage region, the potential energy of the region immediately below the overflow gate electrode is lower than the potential energy of the charge generation region. Therefore, even when the charge is stored in the charge storage region to the extent that the charge overflows into the overflow region, it is possible to suppress the charge from remaining in the charge generation region. Therefore, according to the light detection device, it is possible to improve the detection accuracy.

The control unit may perform the first read process after performing the first charge transfer process multiple times. In this case, it is possible to improve the S/N ratio.

The charge generation region may include an avalanche multiplication region. In this case, since the avalanche multiplication can be caused in the charge generation region, it is possible to increase the detection sensitivity of the photosensor. On the other hand, when the avalanche multiplication region is included in the charge generation region, the amount of charge generated is extremely large. In the light detection device, even in such a case, it is possible to sufficiently suppress the saturation of the storage capacity, and it is possible to sufficiently suppress the charge from remaining in the charge generation region.

The control unit may perform a second charge transfer process, which is for transferring the charge stored in the charge storage region to the overflow region by applying an electric potential to the overflow gate electrode so that the potential energy of the region immediately below the overflow gate electrode is reduced after the first read process, and a second read process, which is for reading a total amount of charge stored in the charge storage region and the overflow region after the second charge transfer process. In this case, not only is the amount of charge stored in the charge storage region read in the first read process, but also the total amount of charge stored in the charge storage region and the overflow region is read in the second read process. As a result, it is possible to improve the charge amount detection accuracy.

The photosensor may further include an unnecessary charge discharge region and an unnecessary charge transfer gate electrode arranged on a region between the charge generation region and the unnecessary charge discharge region. The control unit may perform an unnecessary charge transfer process for transferring the charge generated in the charge generation region to the unnecessary charge discharge region by applying an electric potential to the unnecessary charge transfer gate electrode so that a potential energy of a region immediately below the unnecessary charge transfer gate electrode is lower than the potential energy of the charge generation region in a period other than a period during which the first charge transfer process is performed. In this case, since the charge generated in the charge generation region can be transferred to the unnecessary charge discharge region in a period other than the period during which the first charge transfer process is performed, it is possible to further suppress the charge from remaining in the charge generation region.

The light detection device according to an aspect of the present disclosure may further include a light source that emits detection light, and the control unit may perform the first charge transfer process in a period during which reflected light of the detection light on an object is incident on the charge generation region. In this case, it is possible to accurately detect the amount of charge generated in the charge generation region in a period during which the reflected light of the detection light on the object is incident on the charge generation region.

The light detection device according to an aspect of the present disclosure may further include a photogate electrode arranged on the charge generation region. In the first charge transfer process, the control unit may apply an electric potential to the photogate electrode and the overflow gate electrode so that the potential energy of the region immediately below the transfer gate electrode is lower than the potential energy of the charge generation region and the potential energy of the region immediately below the overflow gate electrode is lower than the potential energy of the charge generation region. In this case, it is possible to accurately adjust the magnitude of the potential energy.

The overflow region may have a charge storage capacity larger than a charge storage capacity of the charge storage region. In this case, it is possible to effectively suppress the saturation of the storage capacity.

A method for driving a photosensor according to an aspect of the present disclosure is a method for driving a photosensor. The photosensor includes a charge generation region that generates charge in response to incident light, a charge storage region, an overflow region, a transfer gate electrode arranged on a region between the charge generation region and the charge storage region, and an overflow gate electrode arranged on a region between the charge storage region and the overflow region. The method for driving the photosensor includes: a charge transfer step for transferring charge generated in the charge generation region to the charge storage region by applying an electric potential to the transfer gate electrode so that a potential energy of a region immediately below the transfer gate electrode is lower than a potential energy of the charge generation region; and a read step for reading an amount of charge stored in the charge storage region after the charge transfer step. In the charge transfer step, an electric potential is applied to the overflow gate electrode so that a potential energy of a region immediately below the overflow gate electrode is lower than the potential energy of the charge generation region.

In the method for driving the photosensor, the photosensor includes the overflow region and the overflow gate electrode disposed on the region between the charge storage region and the overflow region. Therefore, since the charge overflowing from the charge storage region can be stored in the overflow region, it is possible to suppress the saturation of the storage capacity. In addition, during the execution of the charge transfer step for transferring the charge generated in the charge generation region to the charge storage region, the potential energy of the region immediately below the overflow gate electrode is lower than the potential energy of the charge generation region. Therefore, even when the charge is stored in the charge storage region to the extent that the charge overflows into the overflow region, it is possible to suppress the charge from remaining in the charge generation region. Therefore, according to the method for driving the photosensor, it is possible to improve the detection accuracy.

Advantageous Effects of Invention

According to an aspect of the present disclosure, it is possible to provide a light detection device and a method for driving a photosensor capable of improving the detection accuracy.

DESCRIPTION OF EMBODIMENTS

Figure 1:
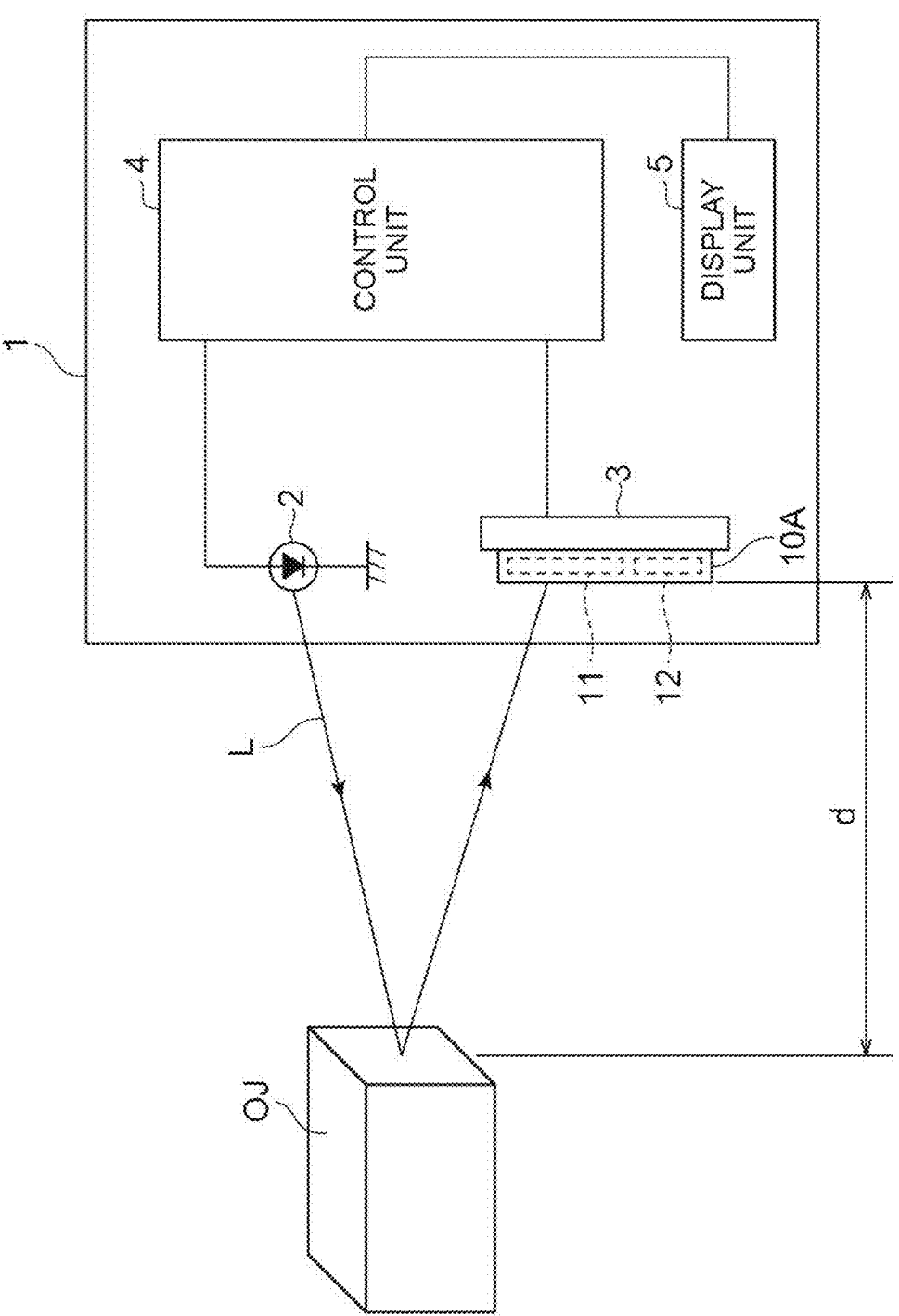
FIG. 1 is a configuration diagram of a distance measurement device according to a first embodiment.

Hereinafter, an embodiment of the present disclosure will be described in detail with reference to the diagrams. In addition, in the following description, the same or equivalent elements are denoted by the same reference numerals, and repeated description thereof will be omitted.

First Embodiment

[Configuration of Distance Measurement Device]

As shown in FIG. 1, a distance measurement device (light detection device) 1 includes a light source 2, a distance measurement sensor (distance measurement image sensor, photosensor) 10A, a signal processing unit 3, a control unit 4, and a display unit 5. The distance measurement device 1 is a device that acquires a distance image of an object OJ (an image including information regarding a distance d to the object OJ) by using an indirect TOF method.

The light source 2 emits pulsed light (detection light) L. The light source 2 is formed by, for example, an infrared LED. The pulsed light L is, for example, near-infrared light, and the frequency of the pulsed light L is, for example, 10 kHz or higher. The distance measurement sensor 10A detects the pulsed light L that is emitted from the light source 2 and reflected by the object OJ. The distance measurement sensor 10A is configured by monolithically forming a pixel unit 11 and a CMOS read circuit unit 12 on a semiconductor substrate (for example, a silicon substrate). The distance measurement sensor 10A is mounted on the signal processing unit 3.

The signal processing unit 3 controls the pixel unit 11 and the CMOS read circuit unit 12 of the distance measurement sensor 10A. The signal processing unit 3 performs predetermined processing on the signal output from the distance measurement sensor 10A to generate a detection signal. The control unit 4 controls the light source 2 and the signal processing unit 3. The control unit 4 generates a distance image of the object OJ based on the detection signal output from the signal processing unit 3. The display unit 5 displays the distance image of the object OJ generated by the control unit 4.

[Configuration of Distance Measurement Sensor]

Figure 2:
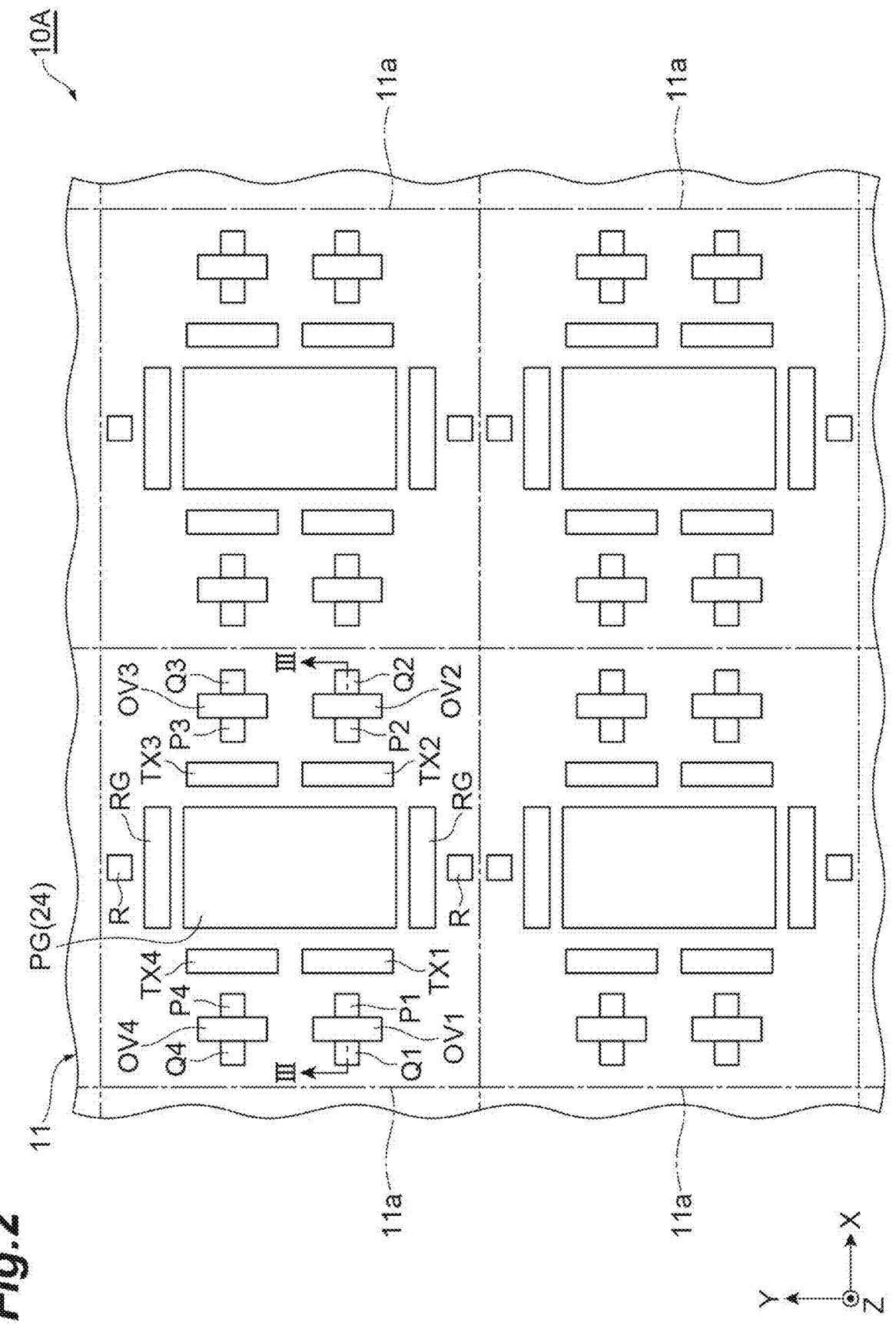
FIG. 2 is a plan view of a pixel unit of a distance measurement sensor.
Figure 3:
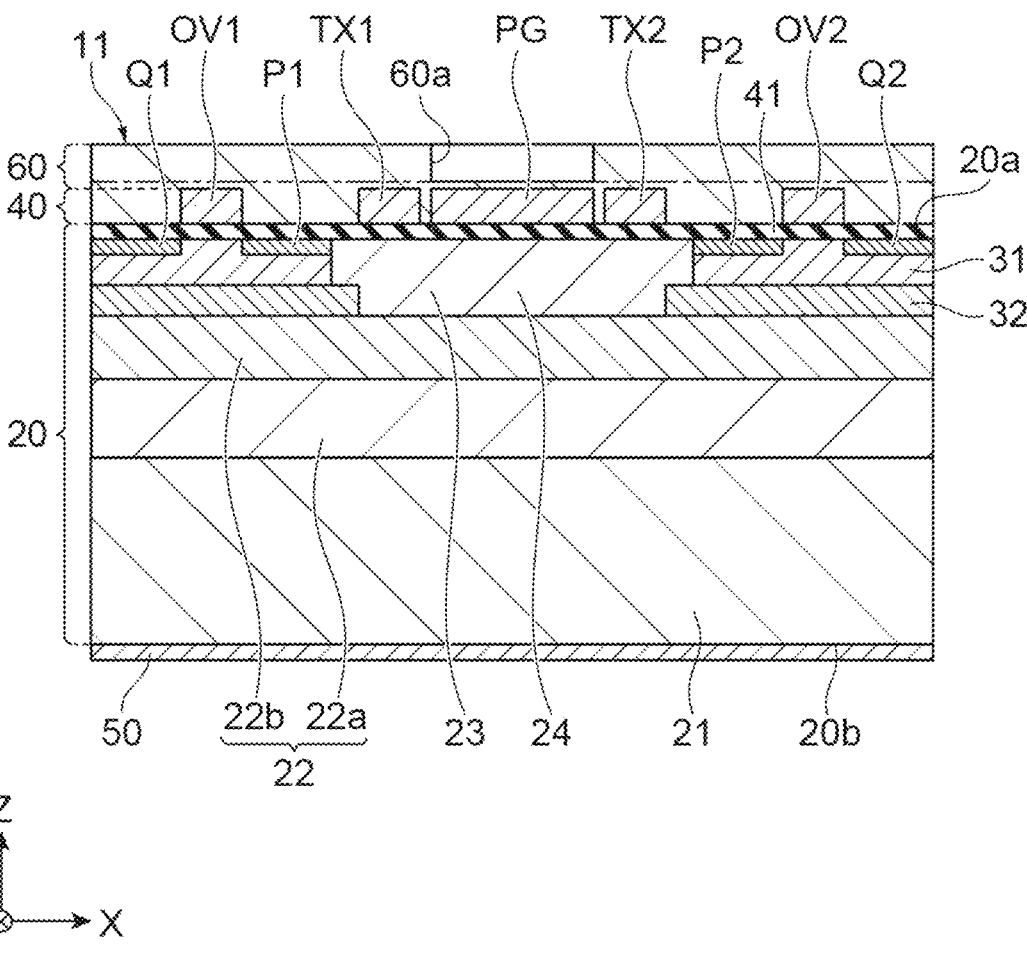
FIG. 3 is a cross-sectional view taken along the line III-III shown in FIG. 2.

As shown in FIGS. 2 and 3, the distance measurement sensor 10A includes a semiconductor layer 20 and an electrode layer 40 in the pixel unit 11. The semiconductor layer 20 has a first surface 20a and a second surface 20b. The first surface 20a is a surface on one side of the semiconductor layer 20 in the thickness direction. The second surface 20b is a surface on the other side of the semiconductor layer 20 in the thickness direction. The electrode layer 40 is provided on the first surface 20a of the semiconductor layer 20. The semiconductor layer 20 and the electrode layer 40 form a plurality of pixels 11a arranged along the first surface 20a. In the distance measurement sensor 10A, the plurality of pixels 11a are arranged in a two-dimensional manner along the first surface 20a. Hereinafter, the thickness direction of the semiconductor layer 20 is referred to as a Z direction, one direction perpendicular to the Z direction is referred to as an X direction, and a direction perpendicular to both the Z direction and the X direction is referred to as a Y direction. In addition, one side in the Z direction is referred to as a first side, and the other side in the Z direction (side opposite to the first side) is referred to as a second side. In addition, in FIG. 2, the arrangement of charge storage regions P1 to P4, overflow regions Q1 to Q4, an unnecessary charge discharge region R, a photogate electrode PG, transfer gate electrodes TX1 to TX4, overflow gate electrodes OV1 to OV4, and an unnecessary charge transfer gate electrode RG, which will be described later, is schematically shown, and other elements are omitted as appropriate.

In the semiconductor layer 20, each pixel 11a has a semiconductor region 21, an avalanche multiplication region 22, a charge distribution region 23, a first charge storage region P1, a second charge storage region P2, a third charge storage region P3, a fourth charge storage region P4, a first overflow region Q1, a second overflow region Q2, a third overflow region Q3, a fourth overflow region Q4, two unnecessary charge discharge regions R, a well region 31, and a barrier region 32. Each of the regions 21 to 23, P1 to P4, Q1 to Q4, R, and 31 and 32 is formed by performing various processes (for example, etching, film formation, impurity injection, and the like) on a semiconductor substrate (for example, a silicon substrate).

The semiconductor region 21 is a p-type (first conductive type) region, and is provided along the second surface 20b in the semiconductor layer 20. The semiconductor region 21 functions as a light absorption region (photoelectric conversion region). As an example, the semiconductor region 21 is a p-type region having a carrier concentration of $1 \times 10^{15}$ cm$^{-3}$ or less, and the thickness of the semiconductor region 21 is about 10 μm. In addition, the avalanche multiplication region 22 and the like also function as a light absorption region (photoelectric conversion region).

The avalanche multiplication region 22 includes a first multiplication region 22a and a second multiplication region 22b. The first multiplication region 22a is a p-type region, and is formed on the first side of the semiconductor region 21 in the semiconductor layer 20. As an example, the first multiplication region 22a is a p-type region having a carrier concentration of $1 \times 10^{16}$ cm$^{-3}$ or more, and the thickness of the first multiplication region 22a is about 1 μm. The second multiplication region 22b is an n-type (second conductive type) region, and is formed on the first side of the first multiplication region 22a in the semiconductor layer 20. As an example, the second multiplication region 22b is an n-type region having a carrier concentration of $1 \times 10^{16}$ cm$^{-3}$ or more, and the thickness of the second multiplication region 22b is about 1 μm. The first multiplication region 22a and the second multiplication region 22b form a pn junction. The avalanche multiplication region 22 is a region that causes avalanche multiplication. The electric field strength generated in the avalanche multiplication region 22 when a reverse bias having a predetermined value is applied is, for example, $3 \times 10^5$ to $4 \times 10^5$ V/cm.

The charge distribution region 23 is an n-type region, and is formed on the first side of the second multiplication region 22b in the semiconductor layer 20. As an example, the charge distribution region 23 is an n-type region having a carrier concentration of $5 \times 10^{15}$ to $1 \times 10^{16}$ cm$^{-3}$, and the thickness of the charge distribution region 23 is about 1 μm.

Each of the charge storage regions P1 to P4 is an n-type region, and is formed on the first side of the second multiplication region 22b in the semiconductor layer 20. Each of the charge storage regions P1 to P4 is connected to the charge distribution region 23. As an example, each of the first charge storage regions P1 to P4 is an n-type region having a carrier concentration of $1 \times 10^{18}$ cm$^{-3}$ or more, and the thickness of each of the first charge storage regions P1 to P4 is about 0.2 μm.

Each of the overflow regions Q1 to Q4 is an n-type region, and is formed on the first side of the second multiplication region 22b in the semiconductor layer 20. The charge storage capacity of the first overflow region Q1 is larger than the charge storage capacity of the first charge storage region P1. The charge storage capacity of the second overflow region Q2 is larger than the charge storage capacity of the second charge storage region P2. The charge storage capacity of the third overflow region Q3 is larger than the charge storage capacity of the third charge storage region P3. The charge storage capacity of the fourth overflow region Q4 is larger than the charge storage capacity of the fourth charge storage region P4. For example, the charge storage capacities of the charge storage regions P1 to P4 are equal, and the charge storage capacities of the overflow regions Q1 to Q4 are equal. A PN junction capacitor is used in the charge storage regions P1 to P4, while an additional capacitor is provided in the overflow regions Q1 to Q4. Therefore, the storage capacities of the overflow regions Q1 to Q4 are larger than the storage capacities of the charge storage regions P1 to P4. Examples of the capacitor to be added include an MIM (Metal Insulator Metal) capacitor, a MOS capacitor, a trench capacitor, a PIP capacitor, and the like.

Each unnecessary charge discharge region R is an n-type region, and is formed on the first side of the second multiplication region 22*b* in the semiconductor layer 20. Each unnecessary charge discharge region R is connected to the charge distribution region 23. The unnecessary charge discharge region R has the same configuration as, for example, the charge storage regions P1 to P4.

The well region 31 is a p-type region, and is formed on the first side of the second multiplication region 22*b* in the semiconductor layer 20. The well region 31 surrounds the charge distribution region 23 when viewed from the Z direction. The well region 31 forms a plurality of read circuits (for example, a source follower amplifier, a reset transistor, and the like). The plurality of read circuits are electrically connected to the charge storage regions P1 to P4 and the overflow regions Q1 to Q4, respectively. As an example, the well region 31 is a p-type region having a carrier concentration of $1 \times 10^{16}$ to $5 \times 10^{17}$ cm$^{-3}$, and the thickness of the well region 31 is about 1 μm.

The barrier region 32 is an n-type region, and is formed between the second multiplication region 22*b* and the well region 31 in the semiconductor layer 20. The barrier region 32 includes the well region 31 when viewed from the Z direction. That is, the well region 31 is located within the barrier region 32 when viewed from the Z direction. The barrier region 32 surrounds the charge distribution region 23. The n-type impurity concentration in the barrier region 32 is higher than the n-type impurity concentration in the second multiplication region 22*b*. As an example, the barrier region 32 is an n-type region having a carrier concentration from the carrier concentration of the second multiplication region 22*b* to about twice the carrier concentration of the second multiplication region 22*b*, and the thickness of the barrier region 32 is about 1 μm. Since the barrier region 32 is formed between the second multiplication region 22*b* and the well region 31, even if a depletion layer formed in the avalanche multiplication region 22 spreads toward the well region 31 due to the application of a high voltage to the avalanche multiplication region 22, the depletion layer is prevented from reaching the well region 31. That is, it is possible to prevent the current from flowing between the avalanche multiplication region 22 and the well region 31 due to the depletion layer reaching the well region 31.

Here, the positional relationship of the respective regions will be described. The first charge storage region P1 faces the second charge storage region P2 in the X direction with the charge distribution region 23 interposed therebetween. The first overflow region Q1 is arranged on a side opposite to the charge distribution region 23 with respect to the first charge storage region P1. The second overflow region Q2 is arranged on a side opposite to the charge distribution region 23 with respect to the second charge storage region P2.

The third charge storage region P3 faces the fourth charge storage region P4 in the X direction with the charge distribution region 23 interposed therebetween. The third overflow region Q3 is arranged on a side opposite to the charge distribution region 23 with respect to the third charge storage region P3. The fourth overflow region Q4 is arranged on a side opposite to the charge distribution region 23 with respect to the fourth charge storage region P4. The first charge storage region P1 and the fourth charge storage region P4 are aligned in the Y direction. The second charge storage region P2 and the third charge storage region P3 are aligned in the Y direction. The first overflow region Q1 and the fourth overflow region Q4 are aligned in the Y direction. The second overflow region Q2 and the third overflow region Q3 are aligned in the Y direction. The two unnecessary charge discharge regions R face each other in the Y direction with the charge distribution region 23 interposed therebetween.

In the electrode layer 40, each pixel 11*a* includes a photogate electrode PG, a first transfer gate electrode TX1, a second transfer gate electrode TX2, a third transfer gate electrode TX3, a fourth transfer gate electrode TX4, a first overflow gate electrode OV1, a second overflow gate electrode OV2, a third overflow gate electrode OV3, a fourth overflow gate electrode OV4, and two unnecessary charge transfer gate electrodes RG. Each of the gate electrodes PG, TX1 to TX4, OV1 to OV4, and RG is formed on the first surface 20*a* of the semiconductor layer 20 with an insulating film 41 interposed therebetween. The insulating film 41 is, for example, a silicon nitride film or a silicon oxide film.

The photogate electrode PG is arranged on the charge distribution region 23. The photogate electrode PG is formed of a material having conductivity and light transmission (for example, polysilicon). As an example, the photogate electrode PG has a rectangular shape having two sides facing each other in the X direction and two sides facing each other in the Y direction when viewed from the Z direction. Of the semiconductor region 21, the avalanche multiplication region 22, and the charge distribution region 23, a region immediately below the photogate electrode PG functions as a charge generation region 24 that generates charge according to incident light. In other words, the photogate electrode PG is arranged on the charge generation region 24. In the charge generation region 24, the charge generated in the semiconductor region 21 is multiplied in the avalanche multiplication region 22 and distributed in the charge distribution region 23. Unlike in the embodiment, when the pulsed light L is incident on the semiconductor layer 20 from the side of a counter electrode 50 (in the case of back surface incidence), the photogate electrode PG does not have to have light transmission. The region immediately below the photogate electrode PG is a region that overlaps the photogate electrode PG when viewed from the Z direction. This point is the same for the other gate electrodes TX1 to TX4, OV1 to OV4, and RG.

The first transfer gate electrode TX1 is arranged on a region between the first charge storage region P1 and the charge generation region 24 in the charge distribution region 23. The second transfer gate electrode TX2 is arranged on a region between the second charge storage region P2 and the charge generation region 24 in the charge distribution region 23. The third transfer gate electrode TX3 is arranged on a region between the third charge storage region P3 and the charge generation region 24 in the charge distribution region 23. The fourth transfer gate electrode TX4 is arranged on a region between the fourth charge storage region P4 and the charge generation region 24 in the charge distribution region 23.

Each of the transfer gate electrodes TX1 to TX4 is formed of a conductive material (for example, polysilicon). As an example, each of the transfer gate electrodes TX1 to TX4 has a rectangular shape having two sides facing each other in the X direction and two sides facing each other in the Y direction when viewed from the Z direction.

The first overflow gate electrode OV1 is arranged on a region between the first charge storage region P1 and the first overflow region Q1 in the well region 31. The second overflow gate electrode OV2 is arranged on a region between the second charge storage region P2 and the second overflow region Q2 in the well region 31. The third overflow gate electrode OV3 is arranged on a region between the third charge storage region P3 and the third overflow region Q3 in the well region 31. The fourth overflow gate electrode OV4 is arranged on a region between the fourth charge storage region P4 and the fourth overflow region Q4 in the well region 31.

Each of the overflow gate electrodes OV1 to OV4 is formed of a conductive material (for example, polysilicon). As an example, each of the overflow gate electrodes OV1 to OV4 has a rectangular shape having two sides facing each other in the X direction and two sides facing each other in the Y direction when viewed from the Z direction.

One of the unnecessary charge transfer gate electrodes RG is arranged on a region between one of the pair of unnecessary charge discharge regions R and the charge generation region 24 in the charge distribution region 23. The other one of the unnecessary charge transfer gate electrodes RG is arranged on a region between the other one of the pair of unnecessary charge discharge regions R and the charge generation region 24 in the charge distribution region 23. Each unnecessary charge transfer gate electrode RG is formed of a conductive material (for example, polysilicon). As an example, each unnecessary charge transfer gate electrode RG has a rectangular shape having two sides facing each other in the X direction and two sides facing each other in the Y direction when viewed from the Z direction.

The distance measurement sensor 10A further includes a counter electrode 50 and a wiring layer 60 in the pixel unit 11. The counter electrode 50 is provided on the second surface 20b of the semiconductor layer 20. The counter electrode 50 includes a plurality of pixels 11a when viewed from the Z direction. The counter electrode 50 faces the electrode layer 40 in the Z direction. The counter electrode 50 is formed of, for example, a metal material. The wiring layer 60 is provided on the first surface 20a of the semiconductor layer 20 so as to cover the electrode layer 40. The wiring layer 60 is electrically connected to each pixel 11a and the CMOS read circuit unit 12 (see FIG. 1). A light incidence opening 60a is formed in a portion of the wiring layer 60 facing the photogate electrode PG of each pixel 11a.

Figure 4:
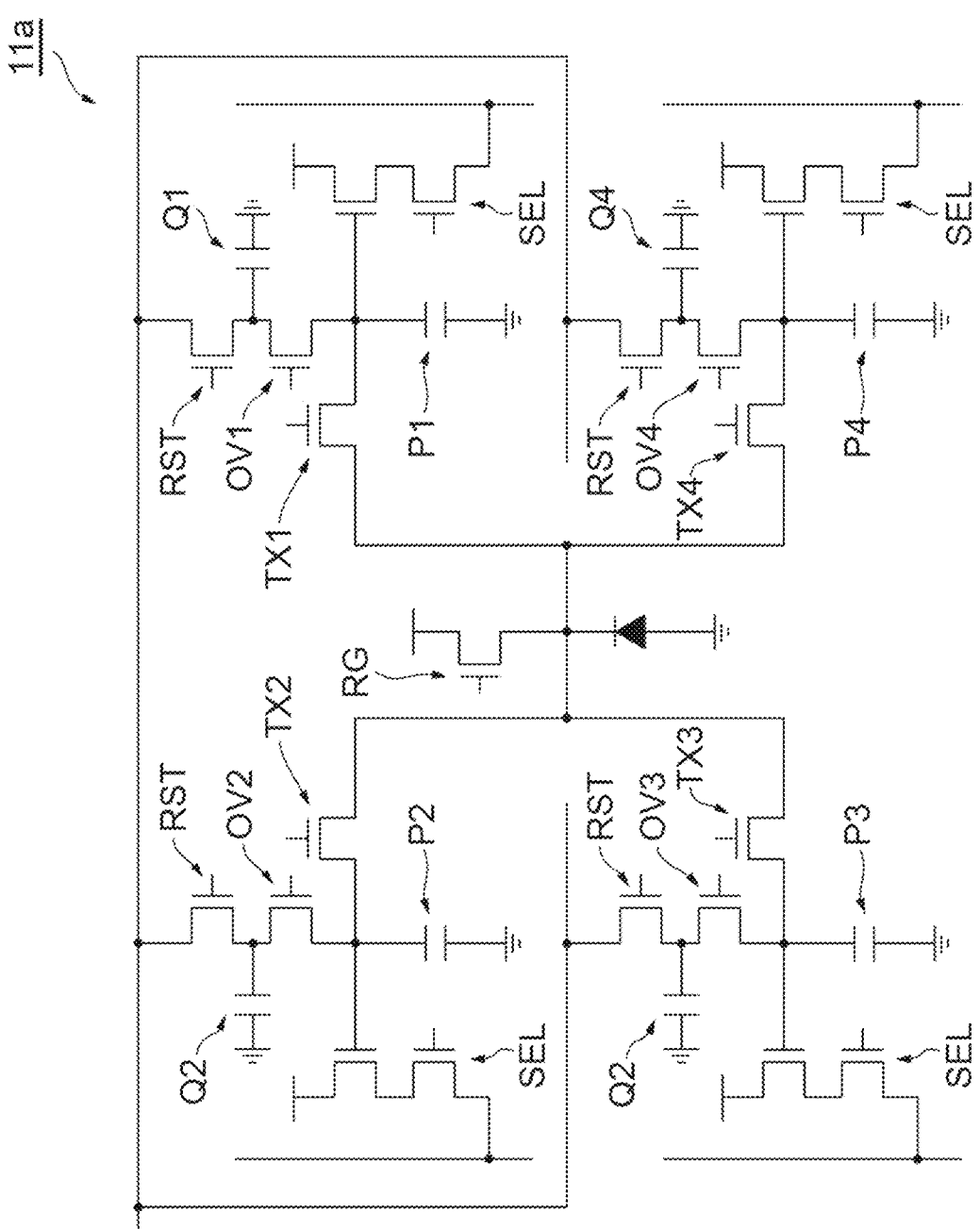
FIG. 4 is a circuit diagram of the distance measurement sensor.

FIG. 4 shows an example of the circuit configuration of each pixel 11a. As shown in FIG. 4, each pixel 11a has a plurality of (four in this example) reset transistors RST connected to the overflow regions Q1 to Q4 and a plurality of (four in this example) selection transistors SEL used for selecting the pixel 11a.

[Method for Driving Distance Measurement Sensor]

Figure 5:
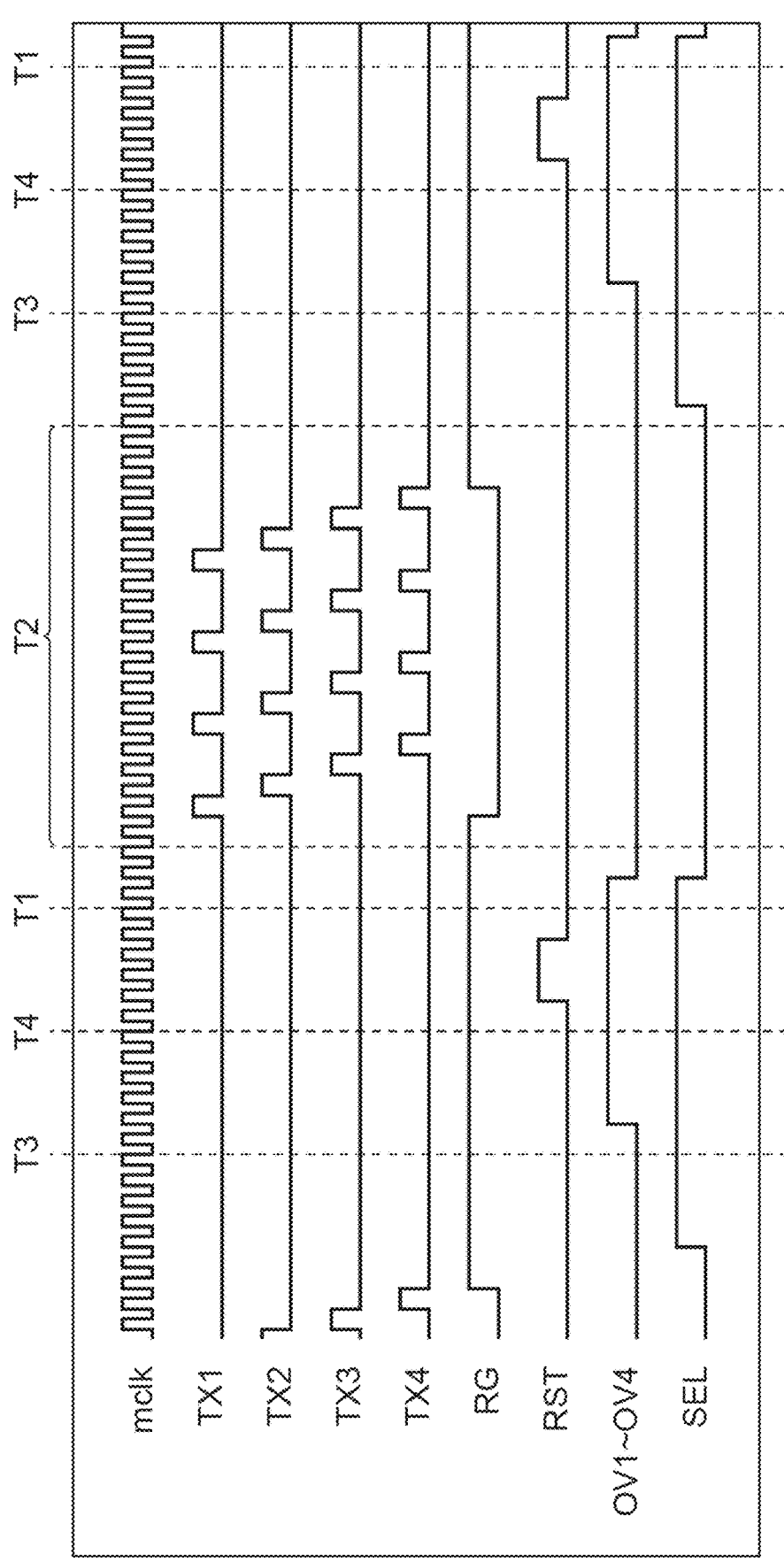
FIG. 5 is a timing chart showing an operation example of the distance measurement sensor.
Figure 6:
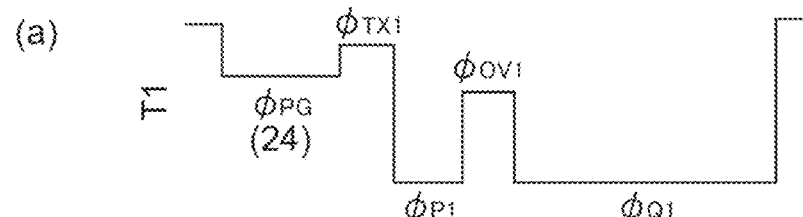
FIGS. 6(a) to 6(d) are potential energy distribution diagrams for explaining an operation example of the distance measurement sensor.
Figure 6:
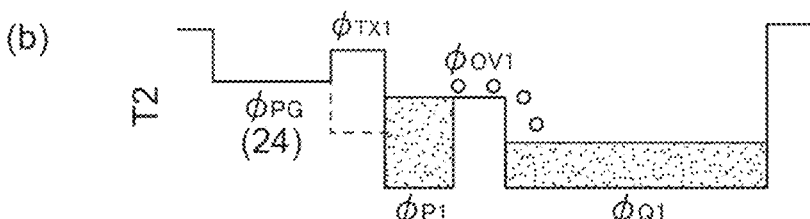
Figure 6:
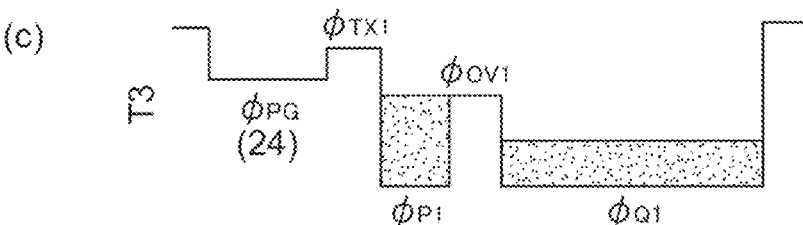
Figure 6:
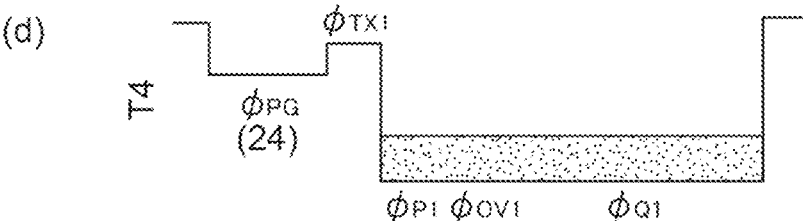

An operation example of the distance measurement sensor 10A will be described with reference to FIGS. 5 and 6. The following operation is realized by the control unit 4 controlling the driving of the distance measurement sensor 10A. In each pixel 11a of the distance measurement sensor 10A, a negative voltage (for example, −50 V) is applied to the counter electrode 50 with the electric potential of the photogate electrode PG as a reference (that is, a reverse bias is applied to the pn junction formed in the avalanche multiplication region 22), so that an electric field strength of $3 \times 10^5$ to $4 \times 10^5$ V/cm is generated in the avalanche multiplication region 22. In this state, when the pulsed light L is incident on the semiconductor layer 20 through the light incidence opening 60a and the photogate electrode PG, electrons generated by the absorption of the pulsed light L are multiplied in the avalanche multiplication region 22 and move to the charge distribution region 23 at high speed.

When generating a distance image of the object OJ (see FIG. 1), first, a reset process (reset step) for applying a reset voltage to each reset transistor RST of each pixel 11a is performed. The reset voltage is a positive voltage with the electric potential of the photogate electrode PG as a reference. Then, the charge stored in the charge storage regions P1 to P4 and the overflow regions Q1 to Q4 is discharged to the outside, so that no charge is stored in the charge storage regions P1 to P4 and the overflow regions Q1 to Q4 (time T1, FIG. 6(a)). The charge is discharged to the outside through, for example, a read circuit configured by the well region 31 and the wiring layer 60. Hereinafter, the operation will be described focusing on one selected pixel 11a.

After the reset process, the charge is stored in the charge storage regions P1 to P4 and the overflow regions Q1 to Q4 in a storage period T2 (FIG. 6(b)). In the storage period T2, charge transfer signals having different phases are applied to the transfer gate electrodes TX1 to TX4. As a result, a charge distribution process (charge distribution step) for distributing the charge generated in the charge generation region 24 between the charge storage regions P1 to P4 is performed.

As an example, the charge transfer signal applied to the first transfer gate electrode TX1 is a voltage signal in which a positive voltage and a negative voltage are alternately repeated with the electric potential of the photogate electrode PG as a reference, and is a voltage signal having the same period, pulse width, and phase as the intensity signal of the pulsed light L emitted from the light source 2 (see FIG. 1). The charge transfer signals applied to the second transfer gate electrode TX2, the third transfer gate electrode TX3, and the fourth transfer gate electrode TX4 are the same voltage signals as the pulse voltage signal applied to the first transfer gate electrode TX1 except that the phases are 90°, 180°, and 270°, respectively.

In a first period during which a positive voltage is applied to the first transfer gate electrode TX1, the potential energy $\phi_{TX1}$ of a region immediately below the first transfer gate electrode TX1 is lower than the potential energy $\phi_{PG}$ of a region (charge generation region 24) immediately below the photogate electrode PG. In other words, in the first period, the electric potential is applied to the photogate electrode PG and the first transfer gate electrode TX1 so that the potential energy $\phi_{TX1}$ is lower than the potential energy $\phi_{PG}$. As a result, the charge generated in the charge generation region 24 is transferred to the first charge storage region P1 (first charge transfer process, first charge transfer step). In FIG. 6(b), the potential energy $\phi_{TX1}$ when a positive voltage is applied to the first transfer gate electrode TX1 is shown by the broken line, and the potential energy $\phi_{TX1}$ when a negative voltage is applied to the first transfer gate electrode TX1 is shown by the solid line. In addition, the charge stored in the first charge storage region P1 and the first overflow region Q1 is shown by hatching.

For adjusting the magnitude of the potential energy of a region immediately below the gate electrode, the magnitude of the electric potential applied to the gate electrode may be adjusted, or instead of or in addition to this, the carrier concentration in the region immediately below the gate electrode may be adjusted. When the potential energy $\phi_{PG}$ of the region (charge generation region 24) immediately below the photogate electrode PG is set to a predetermined magnitude by adjusting the carrier concentration, the photogate electrode PG may not be provided. In this case, the negative voltage described above does not necessarily have to be applied.

In the first period, a negative voltage is applied to the second to fourth transfer gate electrodes TX2 to TX4, and the potential energy $\phi_{TX2}$ of a region immediately below the second transfer gate electrode TX2, the potential energy $\phi_{TX3}$ of a region immediately below the third transfer gate electrode TX3, and the potential energy $\phi_{TX4}$ of a region immediately below the fourth transfer gate electrode TX4 are higher than the potential energy $\phi_{PG}$. As a result, a potential energy barrier is generated between the charge generation region 24 and the second to fourth charge storage regions P2 to P4, so that the charge generated in the charge generation region 24 is not transferred to the second to fourth charge storage regions P2 to P4. In other words, in the first period, the electric potential is applied to the photogate electrode PG and the second to fourth transfer gate electrodes TX2 to TX4 so that the potential energies $\phi_{TX2}$, $\phi_{TX3}$ and $\phi_{TX4}$ are higher than the potential energy $\phi_{PG}$.

In addition, in the first period, the electric potential is applied to the photogate electrode PG and the first overflow gate electrode OV1 so that the potential energy $\phi_{OV1}$ of a region immediately below the first overflow gate electrode OV1 is lower than the potential energy $\phi_{PG}$ of the region (charge generation region 24) immediately below the photogate electrode PG. In other words, the electric potential applied to the first overflow gate electrode OV1 in the first period is set with the electric potential of the photogate electrode PG as a reference so that the potential energy $\phi_{OV1}$ is lower than the potential energy $\phi_{PG}$. As a result, as shown in FIG. 6(b), even when the first charge storage region P1 is saturated with charge, the charge overflowing from the first charge storage region P1 flows into the first overflow region Q1 and stored in the first overflow region Q1.

In a second period during which a positive voltage is applied to the second transfer gate electrode TX2, the potential energy $\phi_{TX2}$ of the region immediately below the second transfer gate electrode TX2 is lower than the potential energy $\phi_{PG}$ of the region (charge generation region 24) immediately below the photogate electrode PG. In other words, in the second period, the electric potential is applied to the photogate electrode PG and the second transfer gate electrode TX2 so that the potential energy $\phi_{TX2}$ is lower than the potential energy $\phi_{PG}$. As a result, the charge generated in the charge generation region 24 is transferred to the second charge storage region P2 (first charge transfer process, first charge transfer step). In the second period, the electric potential is applied to the photogate electrode PG and the first, third, and fourth transfer gate electrodes TX1, TX3, and TX4 so that the potential energies $\phi_{TX1}$, $\phi_{TX3}$, and $\phi_{TX4}$ are higher than the potential energy $\phi_{PG}$.

In addition, in the second period, the electric potential is applied to the photogate electrode PG and the second overflow gate electrode OV2 so that the potential energy $\phi_{OV2}$ of a region immediately below the second overflow gate electrode OV2 is lower than the potential energy $\phi_{PG}$ of the region (charge generation region 24) immediately below the photogate electrode PG. As a result, even when the second charge storage region P2 is saturated with charge, the charge overflowing from the second charge storage region P2 flows into the second overflow region Q2 and stored in the second overflow region Q2.

In a third period during which a positive voltage is applied to the third transfer gate electrode TX3, the potential energy $\phi_{TX3}$ of the region immediately below the third transfer gate electrode TX3 is lower than the potential energy $\phi_{PG}$ of the region (charge generation region 24) immediately below the photogate electrode PG. In other words, in the third period, the electric potential is applied to the photogate electrode PG and the third transfer gate electrode TX3 so that the potential energy $\phi_{TX3}$ is lower than the potential energy $\phi_{PG}$. As a result, the charge generated in the charge generation region 24 is transferred to the third charge storage region P3 (first charge transfer process, first charge transfer step). In the third period, the electric potential is applied to the photogate electrode PG and the first, second, and fourth transfer gate electrodes TX1, TX2, and TX4 so that the potential energies $\phi_{TX1}$, $\phi_{TX2}$, and $\phi_{TX4}$ are higher than the potential energy $\phi_{PG}$.

In addition, in the third period, the electric potential is applied to the photogate electrode PG and the third overflow gate electrode OV3 so that the potential energy $\phi_{OV3}$ of a region immediately below the third overflow gate electrode OV3 is lower than the potential energy $\phi_{PG}$ of the region (charge generation region 24) immediately below the photogate electrode PG. As a result, even when the third charge storage region P3 is saturated with charge, the charge overflowing from the third charge storage region P3 flows into the third overflow region Q3 and stored in the third overflow region Q3.

In a fourth period during which a positive voltage is applied to the fourth transfer gate electrode TX4, the potential energy $\phi_{TX4}$ of the region immediately below the fourth transfer gate electrode TX4 is lower than the potential energy $\phi_{PG}$ of the region (charge generation region 24) immediately below the photogate electrode PG. In other words, in the fourth period, the electric potential is applied to the photogate electrode PG and the fourth transfer gate electrode TX4 so that the potential energy $\phi TX4$ is lower than the potential energy $\phi_{PG}$. As a result, the charge generated in the charge generation region 24 is transferred to the fourth charge storage region P4 (first charge transfer process, first charge transfer step). In the fourth period, the electric potential is applied to the photogate electrode PG and the first to third transfer gate electrodes TX1 to TX3 so that the potential energies $\phi_{TX1}$ to $\phi_{TX3}$ are higher than the potential energy $\phi_{PG}$.

In addition, in the fourth period, the electric potential is applied to the photogate electrode PG and the fourth overflow gate electrode OV4 so that the potential energy $\phi_{OV4}$ of a region immediately below the fourth overflow gate electrode OV4 is lower than the potential energy $\phi_{PG}$ of the region (charge generation region 24) immediately below the photogate electrode PG. As a result, even when the fourth charge storage region P4 is saturated with charge, the charge overflowing from the fourth charge storage region P4 flows into the fourth overflow region Q4 and stored in the fourth overflow region Q4.

After the charge distribution process in the storage period T2, a first read process (high-sensitivity read process) (first read step) for reading the amount of charge stored in each of the charge storage regions P1 to P4 is performed (time T3, FIG. 6(c)). After each of the process in which the charge generated in the charge generation region 24 is transferred to the first charge storage region P1, the process in which the charge generated in the charge generation region 24 is transferred to the second charge storage region P2, the process in which the charge generated in the charge generation region 24 is transferred to the third charge storage region P3, and the process in which the charge generated in the charge generation region 24 is transferred to the fourth charge storage region P4 is performed multiple times, the first read process is performed.

After the first read process, a voltage higher than the voltage applied in the first period is applied to the first overflow gate electrode OV1 to reduce the potential energy $\phi_{OV1}$ of the region immediately below the first overflow gate electrode OV1, thereby performing a charge transfer process (charge transfer step) (second charge transfer process, second charge transfer step) for transferring the charge stored in the first charge storage region P1 to the first overflow region Q1 (FIG. 6(d)). In other words, in the charge transfer process, the charge stored in the first charge storage region P1 is transferred to the first overflow region Q1 by applying the electric potential to the first overflow gate electrode OV1 so that the potential energy $\phi_{OV1}$ is reduced.

Similarly, in the charge transfer process, the charge stored in the second charge storage region P2 is transferred to the second overflow region Q2 by applying the electric potential to the second overflow gate electrode OV2 so that the potential energy $\phi_{OV2}$ of the region immediately below the second overflow gate electrode OV2 is reduced. By applying the electric potential to the third overflow gate electrode OV3 so that the potential energy $\phi_{OV3}$ of the region immediately below the third overflow gate electrode OV3 is reduced, the charge stored in the third charge storage region P3 is transferred to the third overflow region Q3. By applying the electric potential to the fourth overflow gate electrode OV4 so that the potential energy $\phi_{OV4}$ of the region immediately below the fourth overflow gate electrode OV4 is reduced, the charge stored in the fourth charge storage region P4 is transferred to the fourth overflow region Q4.

After the charge transfer process, a second read process (low-sensitivity read process) (second read step) for reading the total amount of charge stored in the first charge storage region P1 and the first overflow region Q1 is performed (time T4, FIG. 6(d)). Similarly, in the second read process, the total amount of charge stored in the second charge storage region P2 and the second overflow region Q2 is read. The total amount of charge stored in the third charge storage region P3 and the third overflow region Q3 is read. The total amount of charge stored in the fourth charge storage region P4 and the fourth overflow region Q4 is read. After the second read process, the reset process described above is performed again (time T1, FIG. 6(a)), so that the series of processes described above are repeatedly performed.

In addition, in a period other than the first to fourth periods, an unnecessary charge transfer process (unnecessary charge transfer step) for transferring the charge generated in the charge generation region 24 to the unnecessary charge discharge region R is performed. In the unnecessary charge transfer process, by applying a positive voltage to the unnecessary charge transfer gate electrode RG, the potential energy $\phi_{RG}$ of a region immediately below the unnecessary charge transfer gate electrode RG is made lower than the potential energy $\phi_{PG}$ of the region (charge generation region 24) immediately below the photogate electrode PG. In other words, the electric potential is applied to the photogate electrode PG and the unnecessary charge transfer gate electrode RG so that the potential energy ORG is lower than the potential energy $\phi_{PG}$. As a result, the charge generated in the charge generation region 24 is transferred to the unnecessary charge discharge region R. The charge transferred to the unnecessary charge discharge region R is discharged to the outside. For example, the unnecessary charge discharge region R is connected to the fixed electric potential, so that the charge transferred to the unnecessary charge discharge region R is discharged to the outside without passing through the read circuit.

As shown in FIG. 1, when the pulsed light L is emitted from the light source 2 and the pulsed light L reflected by the object OJ is detected by the distance measurement sensor 10A, the phase of the intensity signal of the pulsed light L detected by the distance measurement sensor 10A is shifted from the phase of the intensity signal of the pulsed light L emitted from the light source 2 in accordance with the distance d to the object OJ. Therefore, by acquiring a signal based on the amount of charge stored in the charge storage regions P1 to P4 and the overflow regions Q1 to Q4 (that is, the amount of charge read in the first read process and the second read process) for each pixel 11a, it is possible to generate the distance image of the object OJ.

Functions and Effects of First Embodiment

In the distance measurement device 1, the distance measurement sensor 10A has the first overflow region Q1 having a charge storage capacity larger than the charge storage capacity of the first charge storage region P1, the second overflow region Q2 having a charge storage capacity larger than the charge storage capacity of the second charge storage region P2, the first overflow gate electrode OV1 arranged on a region between the first charge storage region P1 and the first overflow region Q1, and the second overflow gate electrode OV2 arranged on a region between the second charge storage region P2 and the second overflow region Q2. Therefore, the charge overflowing from the first charge storage region P1 can be stored in the first overflow region Q1, and the charge overflowing from the second charge storage region P2 can be stored in the second overflow region Q2. As a result, it is possible to suppress the saturation of the storage capacity. In addition, in the first period of the charge distribution process, the potential energy $\phi_{OV1}$ of the region immediately below the first overflow gate electrode OV1 is lower than the potential energy $\phi_{PG}$ of the charge generation region 24, and in the second period of the charge distribution process, the potential energy $\phi_{OV2}$ of the region immediately below the second overflow gate electrode OV2 is lower than the potential energy $\phi_{PG}$ of the charge generation region 24. As a result, even when the charge is stored in the first charge storage region P1 to the extent that the charge overflows into the first overflow region Q1 and when the charge is stored in the second charge storage region P2 to the extent that the charge overflows into the second overflow region Q2, it is possible to suppress the charge from remaining in the charge generation region 24. Therefore, according to the distance measurement device 1, it is possible to improve the accuracy of distance measurement. In addition, it is possible to achieve high sensitivity and high dynamic range.

Figure 7:
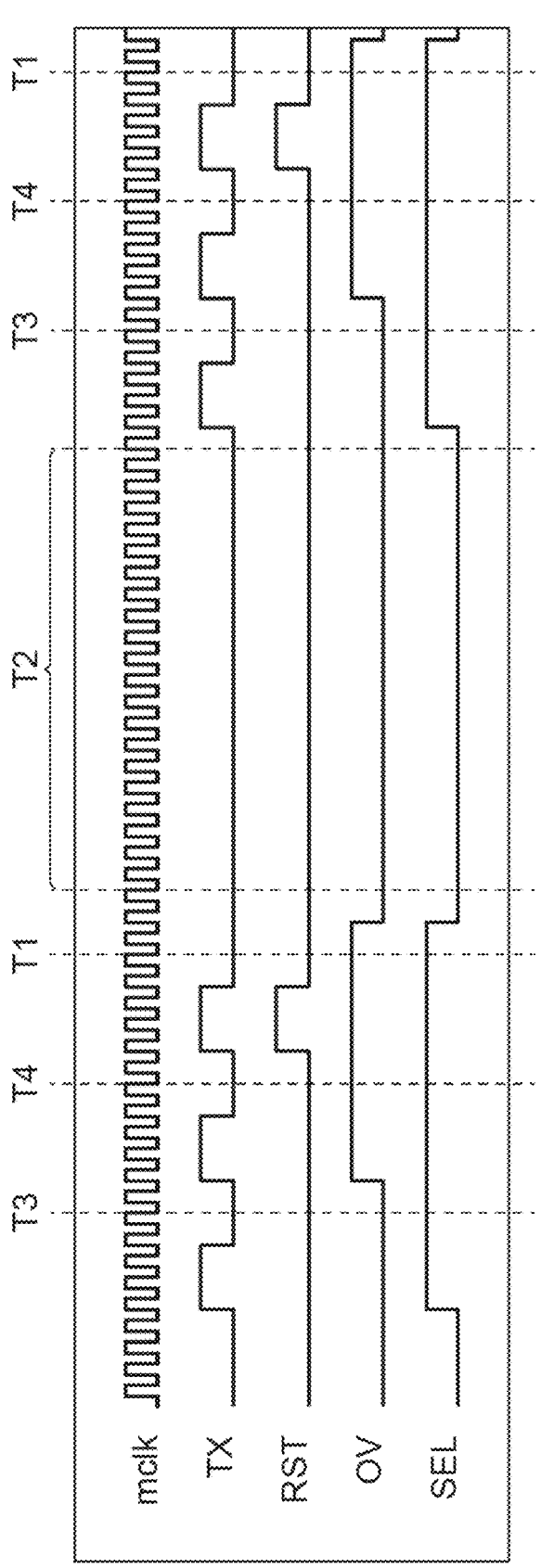
FIG. 7 is a timing chart showing an operation example of an image sensor according to a comparative example.
Figure 8:
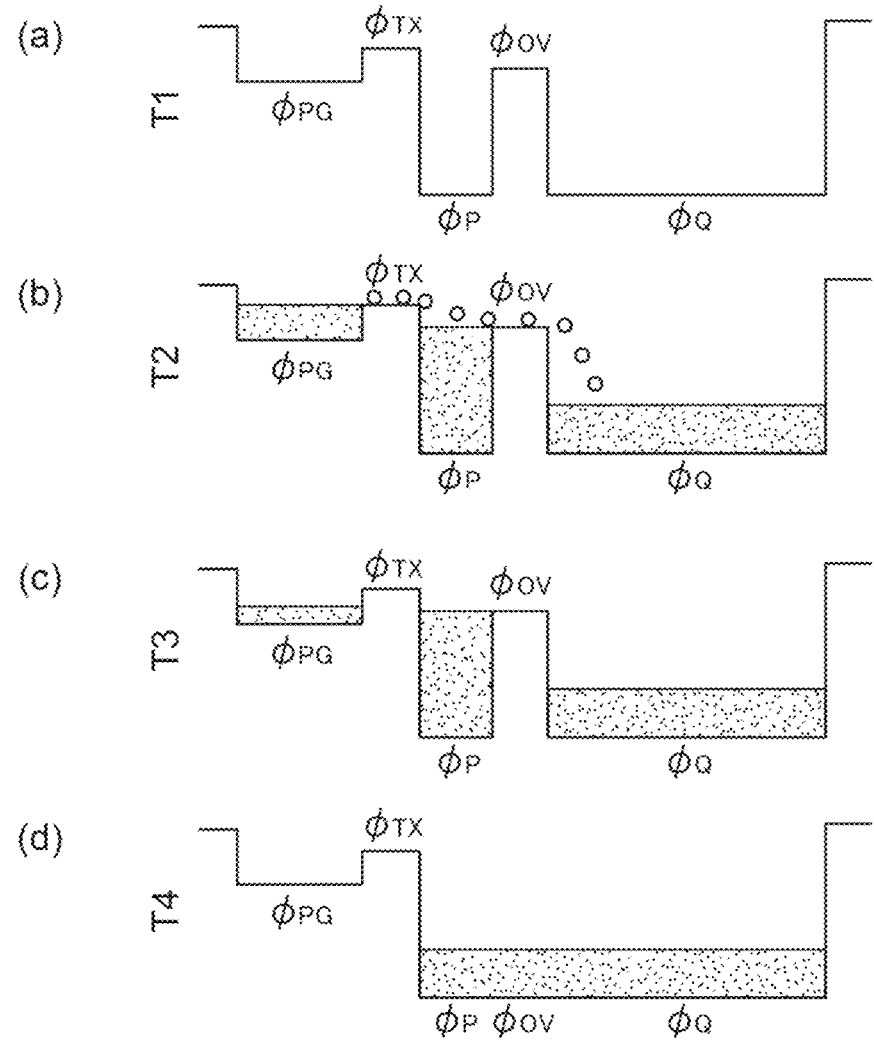
FIGS. 8(a) to 8(d) are potential energy distribution diagrams for explaining an operation example of the image sensor according to the comparative example.

This point will be further described with reference to a comparative example shown in FIGS. 7 and 8. In the image sensor of the comparative example, the potential energy MIX of a region immediately below the transfer gate electrode TX is higher than the potential energy $\phi_{PG}$ of a region immediately below the photogate electrode PG over the entire storage period T2 (FIG. 8(b)). In addition, the potential energy $\phi_{OV}$ of a region immediately below the overflow gate electrode OV is higher than the potential energy $\phi_{PG}$ of the region immediately below the photogate electrode PG over the entire storage period T2. After the storage period T2, the potential energy $\phi_{TX}$ of the region immediately below the transfer gate electrode TX is lower than the potential energy $\phi_{PG}$ of the region (charge generation region) immediately below the photogate electrode PG, so that the charge stored in the charge generation region is transferred to the charge storage region P. Thereafter, the amount of charge stored in the charge storage region P is read (time T3, FIG. 8(c)).

In the image sensor of the comparative example, in the storage period T2, the potential energy $\phi_{OV}$ of the region immediately below the overflow gate electrode OV is higher than the potential energy $\phi_{PG}$ of the region immediately below the photogate electrode PG. Therefore, as shown in FIG. 8(c), when the charge is stored in the charge storage region P to the extent that the charge overflows into the overflow region Q, a part of the charge remains in the region (charge generation region) immediately below the photogate electrode PG. In this case, the accuracy of distance measurement may decrease due to the charge remaining in the charge storage region.

In contrast, as described above, in the distance measurement device 1, the potential energy $\phi_{OV1}$ of the region immediately below the first overflow gate electrode OV1 and the potential energy $\phi_{OV2}$ of the region immediately below the second overflow gate electrode OV2 are lower than the potential energy $\phi_{PG}$ of the charge generation region 24 during the execution of the charge distribution process. As a result, even when the charge is stored in the first charge storage region P1 or the second charge storage region P2 to the extent that the charge overflows into the first overflow region Q1 or the second overflow region Q2, it is possible to suppress the charge from remaining in the charge generation region 24.

After performing the first charge transfer process for transferring the charge generated in the charge generation region 24 to the first charge storage region P1 multiple times, the control unit 4 performs a first read process for reading the amount of charge stored in the charge storage region P1. In this manner, it is possible to improve the S/N ratio.

The charge generation region 24 includes the avalanche multiplication region 22. In this case, since the avalanche multiplication can be caused in the charge generation region 24, it is possible to increase the detection sensitivity of the distance measurement sensor 10A. On the other hand, when the avalanche multiplication region 22 is included in the charge generation region 24, the amount of charge generated is extremely large. In the distance measurement device 1, even in such a case, it is possible to sufficiently suppress the saturation of the storage capacity, and it is possible to sufficiently suppress the charge from remaining in the charge generation region 24.

The control unit 4 performs a first read process for reading the amount of charge stored in the first charge storage region P1 and the second charge storage region P2, a second charge transfer process for transferring the charge stored in the first charge storage region P1 to the first overflow region Q1 and transferring the charge stored in the second charge storage region P2 to the second overflow region Q2, and a second read process for reading the total amount of charge stored in the first charge storage region P1 and the first overflow region Q1 and reading the total amount of charge stored in the second charge storage region P2 and the second overflow region Q2. Therefore, not only is the amount of charge stored in the first and second charge storage regions P2 read in the first read process, but also the total amount of charge stored in the first charge storage region P1 and the first overflow region Q1 and the total amount of charge stored in the second charge storage region P2 and the second overflow region Q2 are read in the second read process. As a result, it is possible to improve the charge amount detection accuracy.

The control unit 4 performs an unnecessary charge transfer process for transferring the charge generated in the charge generation region 24 to the unnecessary charge discharge region R by using the unnecessary charge transfer gate electrode RG in a period other than the first period and the second period (that is, a period other than the period during which the first charge transfer process is performed). Therefore, since the charge generated in the charge generation region 24 can be transferred to the unnecessary charge discharge region R in a period other than the first and second periods, it is possible to further suppress the charge from remaining in the charge generation region 24. The unnecessary charge transfer process is particularly useful in an environment in which there is a lot of ambient light.

In the first period, the control unit 4 applies the electric potential to the photogate electrode PG and the first transfer gate electrode TX1 so that the potential energy $\phi_{TX1}$ of the region immediately below the first transfer gate electrode TX1 is lower than the potential energy $\phi_{PG}$ of the region (charge generation region 24) immediately below the photogate electrode PG and the potential energy $\phi_{OV1}$ of the region immediately below the first overflow gate electrode OV1 is lower than the potential energy $\phi_{PG}$ of the region immediately below the photogate electrode PG. In the second period, the control unit 4 applies the electric potential to the photogate electrode PG and the second transfer gate electrode TX2 so that the potential energy $\phi_{TX2}$ of the region immediately below the second transfer gate electrode TX2 is lower than the potential energy $\phi_{PG}$ of the region immediately below the photogate electrode PG and the potential energy $\phi_{OV2}$ of the region immediately below the second overflow gate electrode OV2 is lower than the potential energy $\phi_{PG}$ of the region immediately below the photogate electrode PG. In the third period, the control unit 4 applies the electric potential to the photogate electrode PG and the third transfer gate electrode TX3 so that the potential energy $\phi_{TX3}$ of the region immediately below the third transfer gate electrode TX3 is lower than the potential energy $\phi_{PG}$ of the region immediately below the photogate electrode PG and the potential energy $\phi_{OV3}$ of the region immediately below the third overflow gate electrode OV3 is lower than the potential energy $\phi_{PG}$ of the region immediately below the photogate electrode PG. In the fourth period, the control unit 4 applies the electric potential to the photogate electrode PG and the fourth transfer gate electrode TX4 so that the potential energy $\phi_{TX4}$ of the region immediately below the fourth transfer gate electrode TX4 is lower than the potential energy $\phi_{PG}$ of the region immediately below the photogate electrode PG and the potential energy $\phi_{OV4}$ of the region immediately below the fourth overflow gate electrode OV4 is lower than the potential energy $\phi_{PG}$ of the region immediately below the photogate electrode PG. As a result, it is possible to accurately adjust the magnitude of each potential energy.

The distance measurement sensor 10A has not only the first and second charge storage regions P1 and P2, the first and second overflow regions Q1 and Q2, the first and second transfer gate electrodes TX1 and TX2, and the first and second overflow gate electrodes OV1 and OV2 but also the third and fourth charge storage regions P3 and P4, the third and fourth overflow regions Q3 and Q4, the third and fourth transfer gate electrodes TX3 and TX4, and the third and fourth overflow gate electrodes OV3 and OV4. Then, in the charge distribution process, the control unit 4 applies charge transfer signals having different phases to the transfer gate electrodes TX1 to TX4, so that the charge generated in the charge generation region 24 is distributed between the charge storage regions P1 to P4. Therefore, since charge distribution by the first to fourth transfer gate electrodes TX1 to TX4 can be realized, it is possible to improve the accuracy of distance measurement.

Modification Examples of First Embodiment

Figure 9:
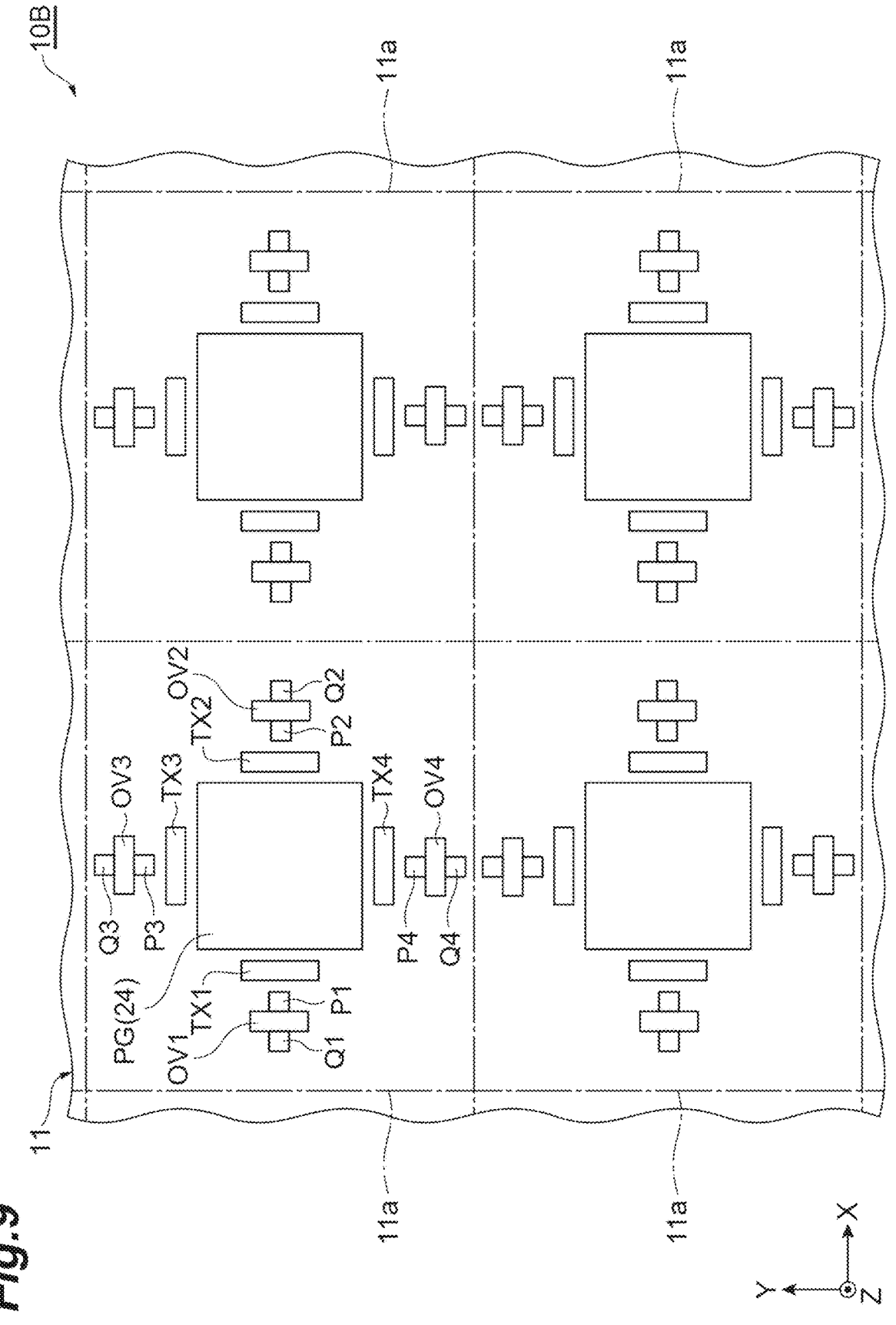
FIG. 9 is a plan view of a part of a distance measurement sensor according to a first modification example.
Figure 10:
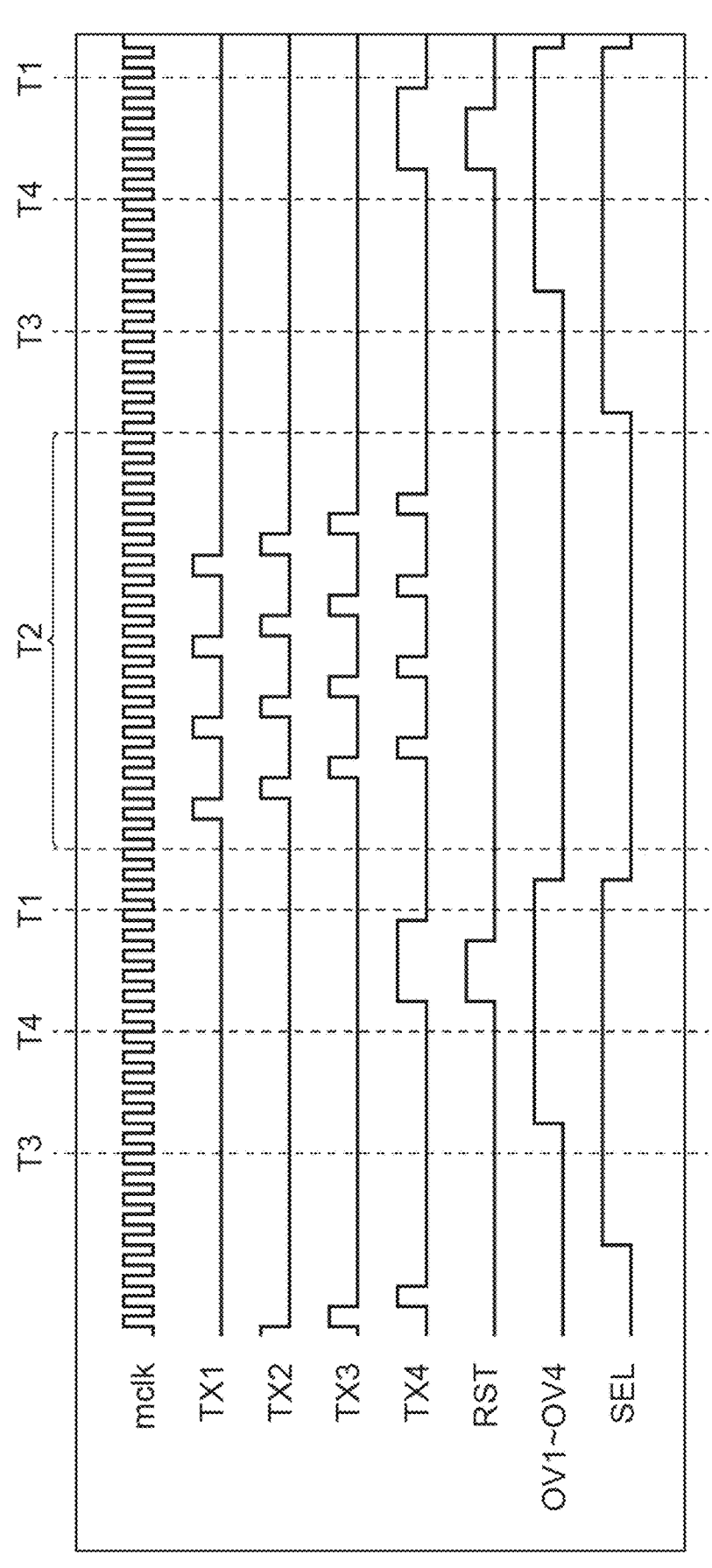
FIG. 10 is a timing chart showing an operation example of the distance measurement sensor according to the first modification example.

In a distance measurement sensor 10B according to a first modification example shown in FIG. 9, the unnecessary charge discharge region R and the unnecessary charge transfer gate electrode RG are not provided in each pixel unit 11. The third charge storage region P3 faces the fourth charge storage region P4 in the Y direction with the charge generation region 24 (photogate electrode PG) interposed therebetween. The distance measurement sensor 10B is driven, for example, as shown in FIG. 10. In this driving method, the unnecessary charge transfer process for transferring the charge generated in the charge generation region 24 to the unnecessary charge discharge region R is not performed. Also in the first modification example, as in the embodiment described above, it is possible to improve the accuracy of distance measurement by suppressing the saturation of the storage capacity and suppressing the charge from remaining in the charge generation region 24.

Figure 11:
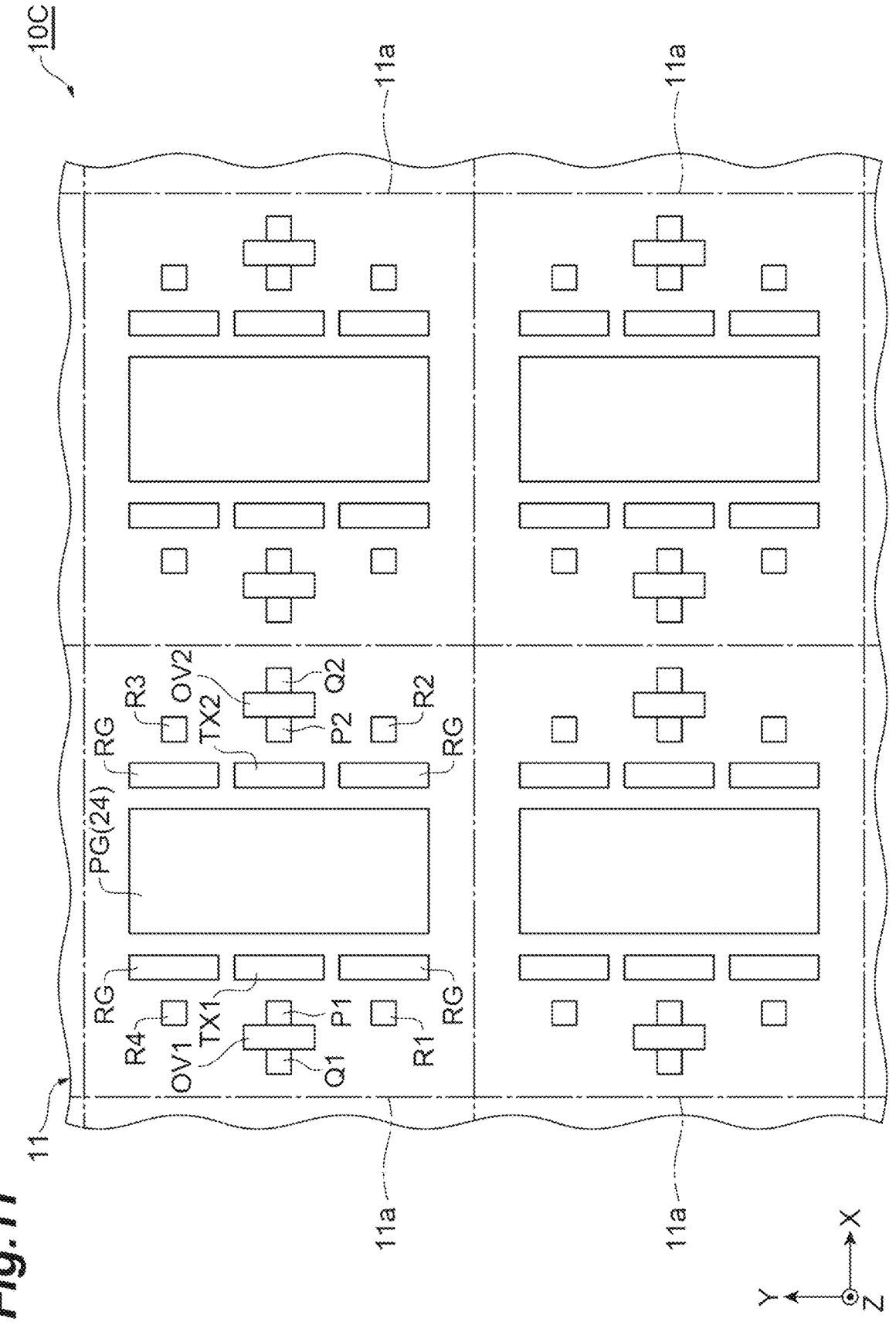
FIG. 11 is a plan view of a part of a distance measurement sensor according to a second modification example.

In a distance measurement sensor 10C according to a second modification example shown in FIG. 11, the third and fourth charge storage regions P3 and P4, the third and fourth overflow regions Q3 and Q4, the third and fourth transfer gate electrodes TX3 and TX4, and the third and fourth overflow gate electrodes OV3 and OV4 are not provided in each pixel unit 11. Each pixel unit 11 has four unnecessary charge discharge regions R1, R2, R3, and R4 and four unnecessary charge transfer gate electrodes RG. The unnecessary charge discharge regions R1 and R2 face each other in the X direction with the charge generation region 24 (photogate electrode PG) interposed therebetween. The unnecessary charge discharge regions R3 and R4 face each other in the X direction with the charge generation region 24 interposed therebetween. The unnecessary charge discharge regions R1 and R4 face each other in the Y direction with the first charge storage region P1 interposed therebetween. The unnecessary charge discharge regions R2 and R3 face each other in the Y direction with the second charge storage region P2 interposed therebetween.

Figure 12:
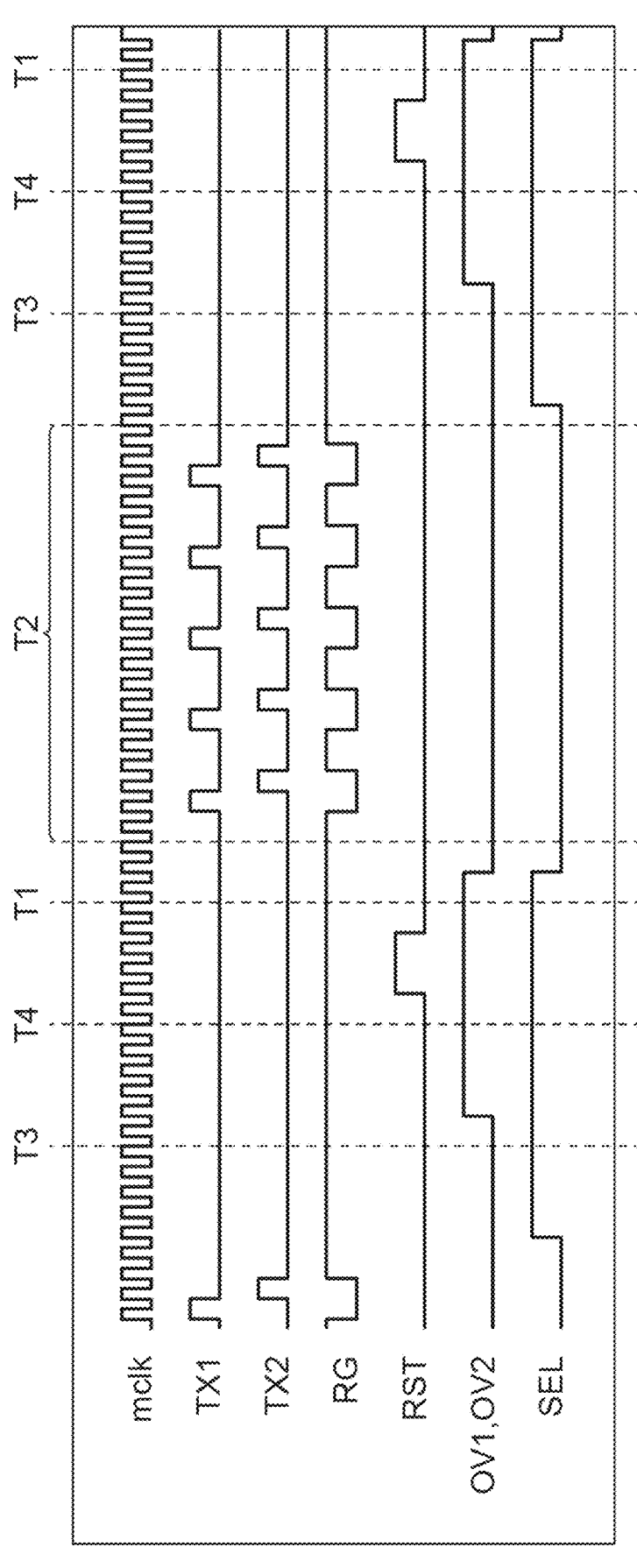
FIG. 12 is a timing chart showing an operation example of the distance measurement sensor according to the second modification example.

The distance measurement sensor 10C is driven, for example, as shown in FIG. 12. In this driving method, in the storage period T2, a first period during which a positive voltage is applied to the first transfer gate electrode TX1, a second period during which a positive voltage is applied to the second transfer gate electrode TX2, and a period during which an unnecessary charge transfer process for transferring the charge generated in the charge generation region 24 to the unnecessary charge discharge region R are repeated in this order. A distance image of the object OJ can also be generated by such a driving method. Also in the second modification example, as in the embodiment described above, it is possible to improve the accuracy of distance measurement by suppressing the saturation of the storage capacity and suppressing the charge from remaining in the charge generation region 24.

Figure 13:
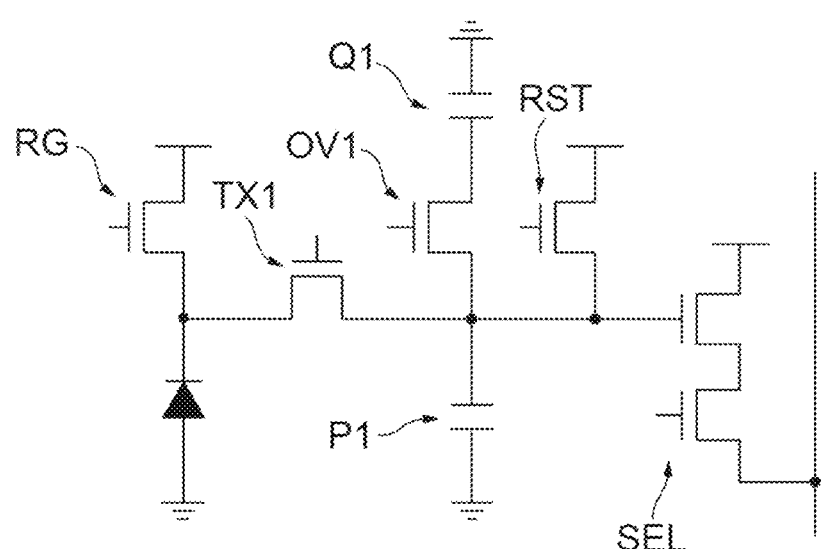
FIG. 13 is a circuit diagram of a distance measurement sensor according to a third modification example.

As in a third modification example shown in FIG. 13, the reset transistor RST may be arranged at a position different from that in the embodiment. In FIG. 13, only the circuit configuration of a part of the pixel 11a is shown. Also in the third modification example, as in the embodiment described above, it is possible to improve the accuracy of distance measurement by suppressing the saturation of the storage capacity and suppressing the charge from remaining in the charge generation region 24.

Second Embodiment

Figure 14:
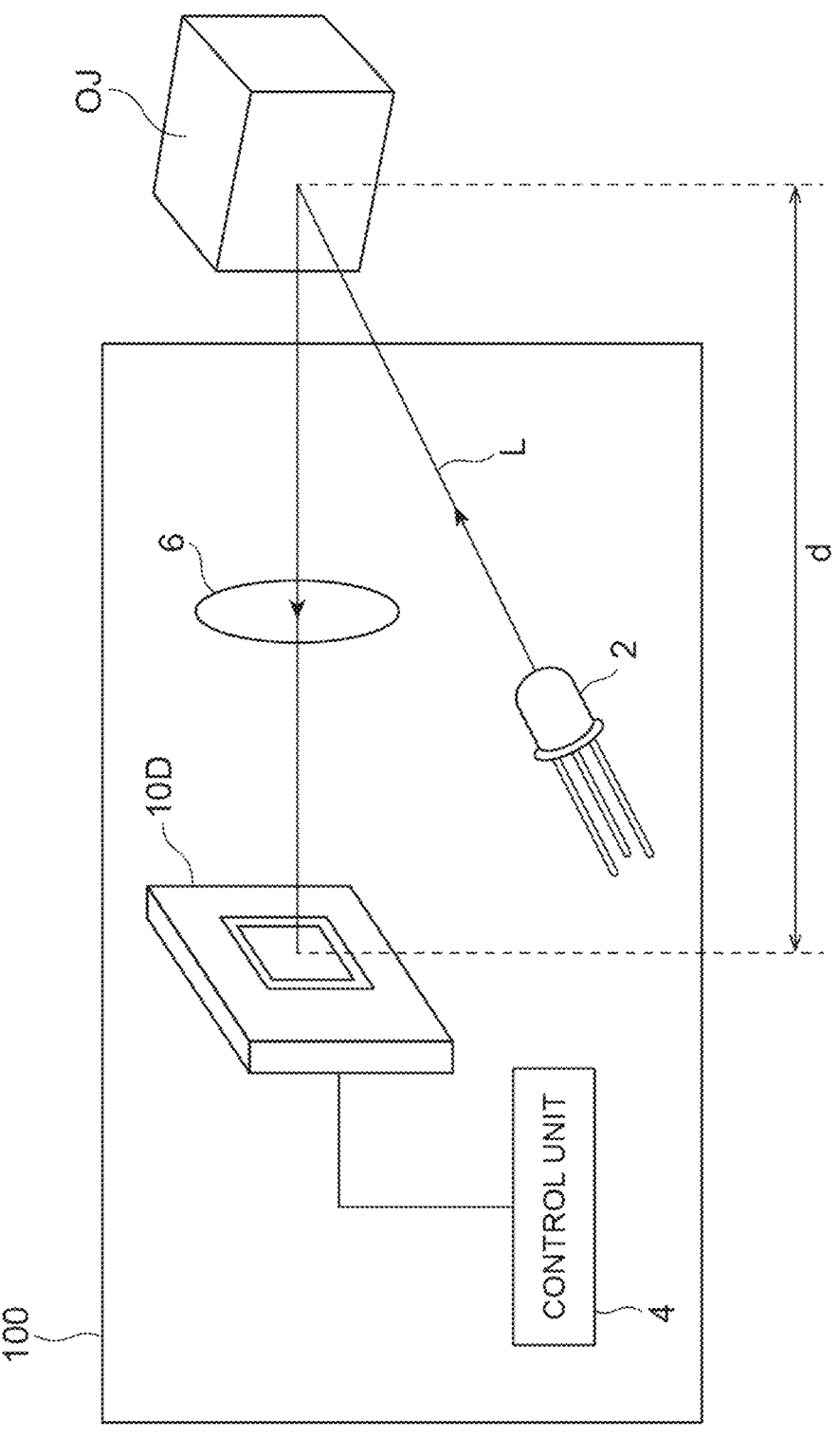
FIG. 14 is a configuration diagram of a light detection device according to a second embodiment.

As shown in FIG. 14, a light detection device 100 includes a light source 2, an image sensor 10D, a control unit 4, and an optical system 6. The light detection device 100 is configured as a range gate camera having a gating function (shutter function) for detecting light arriving at a predetermined timing (in a predetermined period). The optical system 6 guides the pulsed light L, which is emitted from the light source 2 and reflected by the object OJ, to the pixel unit 11 of the image sensor 10D.

Figure 15:
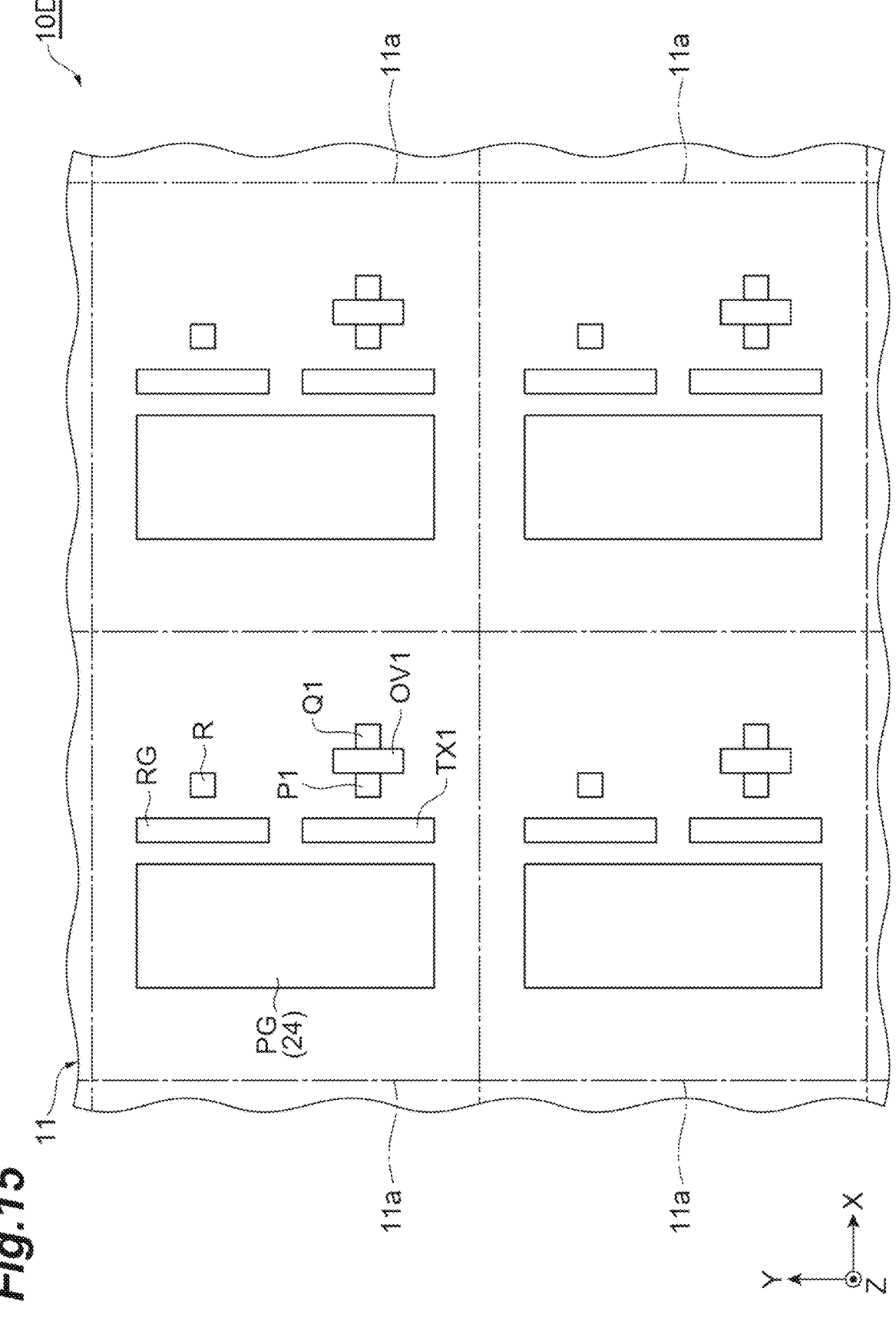
FIG. 15 is a plan view of a part of an image sensor according to the second embodiment.

As shown in FIG. 15, the image sensor 10D is different from the above-described distance measurement sensor 10A in that the second to fourth charge storage regions P2 to P4, the second to fourth overflow regions Q2 to Q4, the second to fourth transfer gate electrodes TX2 to TX4, and the second to fourth overflow gate electrodes OV2 to OV4 are not provided. In the image sensor 10D, the first charge storage region P1 and the unnecessary charge discharge region R are arranged on one side in the X direction with respect to the charge generation region 24 (photogate electrode PG). The first charge storage region P1 and the unnecessary charge discharge region R are aligned in the Y direction. The first transfer gate electrode TX1 and the unnecessary charge transfer gate electrode RG are aligned in the Y direction.

Figure 16:
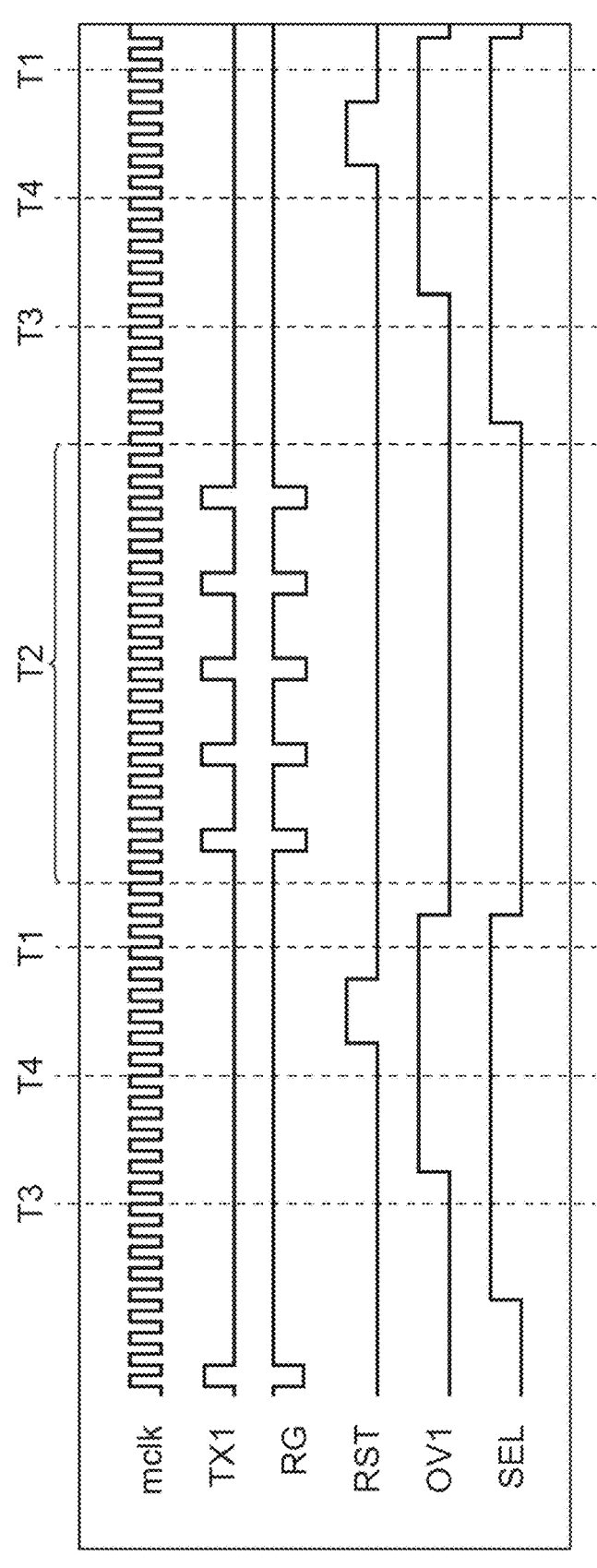
FIG. 16 is a timing chart showing an operation example of the image sensor according to the second embodiment.

The light detection device 100 is driven, for example, as shown in FIG. 16. In this driving method, in the storage period T2, instead of the charge distribution process, a first charge transfer process (first charge transfer step) for transferring the charge generated in the charge generation region 24 to the first charge storage region P1 is repeatedly performed. As an example, the charge transfer signal applied to the first transfer gate electrode TX1 is a voltage signal in which a positive voltage and a negative voltage are alternately repeated with the electric potential of the photogate electrode PG as a reference, and is a voltage signal having the same period and pulse width as the intensity signal of the pulsed light L emitted from the light source 2 except that the phases are shifted by a predetermined amount.

In a period during which a positive voltage is applied to the first transfer gate electrode TX1, the potential energy $\phi_{TX1}$ of the region immediately below the first transfer gate electrode TX1 is lower than the potential energy $\phi_{PG}$ of the region (charge generation region 24) immediately below the photogate electrode PG. In other words, in the period, the electric potential is applied to the photogate electrode PG and the first transfer gate electrode TX1 so that the potential energy $\phi_{TX1}$ is lower than the potential energy $\phi_{PG}$. As a result, the charge generated in the charge generation region 24 is transferred to the first charge storage region P1.

On the other hand, in a period during which a negative voltage is applied to the first transfer gate electrode TX1, the potential energy $\phi_{TX1}$ of the region immediately below the first transfer gate electrode TX1 is higher than the potential energy $\phi_{PG}$ of the region (charge generation region 24) immediately below the photogate electrode PG. In other words, in the period, the electric potential is applied to the photogate electrode PG and the first transfer gate electrode TX1 so that the potential energy $\phi_{TX1}$ is higher than the potential energy $\phi_{PG}$. As a result, a potential energy barrier is generated between the charge generation region 24 and the first charge storage region P1, so that the charge generated in the charge generation region 24 is not transferred to the first charge storage region P1.

In addition, in the storage period T2, the electric potential is applied to the photogate electrode PG and the first overflow gate electrode OV1 so that the potential energy $\phi_{OV1}$ of the region immediately below the first overflow gate electrode OV1 is lower than the potential energy $\phi_{PG}$ of the region (charge generation region 24) immediately below the photogate electrode PG. As a result, even when the first charge storage region P1 is saturated with charge, the charge overflowing from the first charge storage region P1 flows into the first overflow region Q1 and stored in the first overflow region Q1.

In addition, in a period other than the period during which the first charge transfer process is performed, an unnecessary charge transfer process (unnecessary charge transfer step) for transferring the charge generated in the charge generation region 24 to the unnecessary charge discharge region R is performed. In the unnecessary charge transfer process, the electric potential is applied to the photogate electrode PG and the unnecessary charge transfer gate electrode RG so that the potential energy $\phi_{RG}$ of the region immediately below the unnecessary charge transfer gate electrode RG is lower than the potential energy $\phi_{PG}$ of the region (charge generation region 24) immediately below the photogate electrode PG. As a result, the charge generated in the charge generation region 24 is transferred to the unnecessary charge discharge region R.

After the charge transfer process is performed multiple times in the storage period T2, a first read process (high-sensitivity read process) (first read step) for reading the amount of charge stored in the first charge storage region P1 is performed (time T3). After the first read process, a voltage higher than the voltage applied in the storage period T2 is applied to the first overflow gate electrode OV1 to reduce the potential energy $\phi_{OV1}$ of the region immediately below the first overflow gate electrode OV1, thereby performing a second charge transfer process (second charge transfer step) for transferring the charge stored in the first charge storage region P1 to the first overflow region Q1. In other words, in the second charge transfer process, the charge stored in the first charge storage region P1 is transferred to the first overflow region Q1 by applying the electric potential to the first overflow gate electrode OV1 so that the potential energy $\phi_{OV1}$ is reduced. After the second charge transfer process, a second read process (low-sensitivity read process) (second read step) for reading the total amount of charge stored in the first charge storage region P1 and the first overflow region Q1 is performed (time T4).

Figure 17:
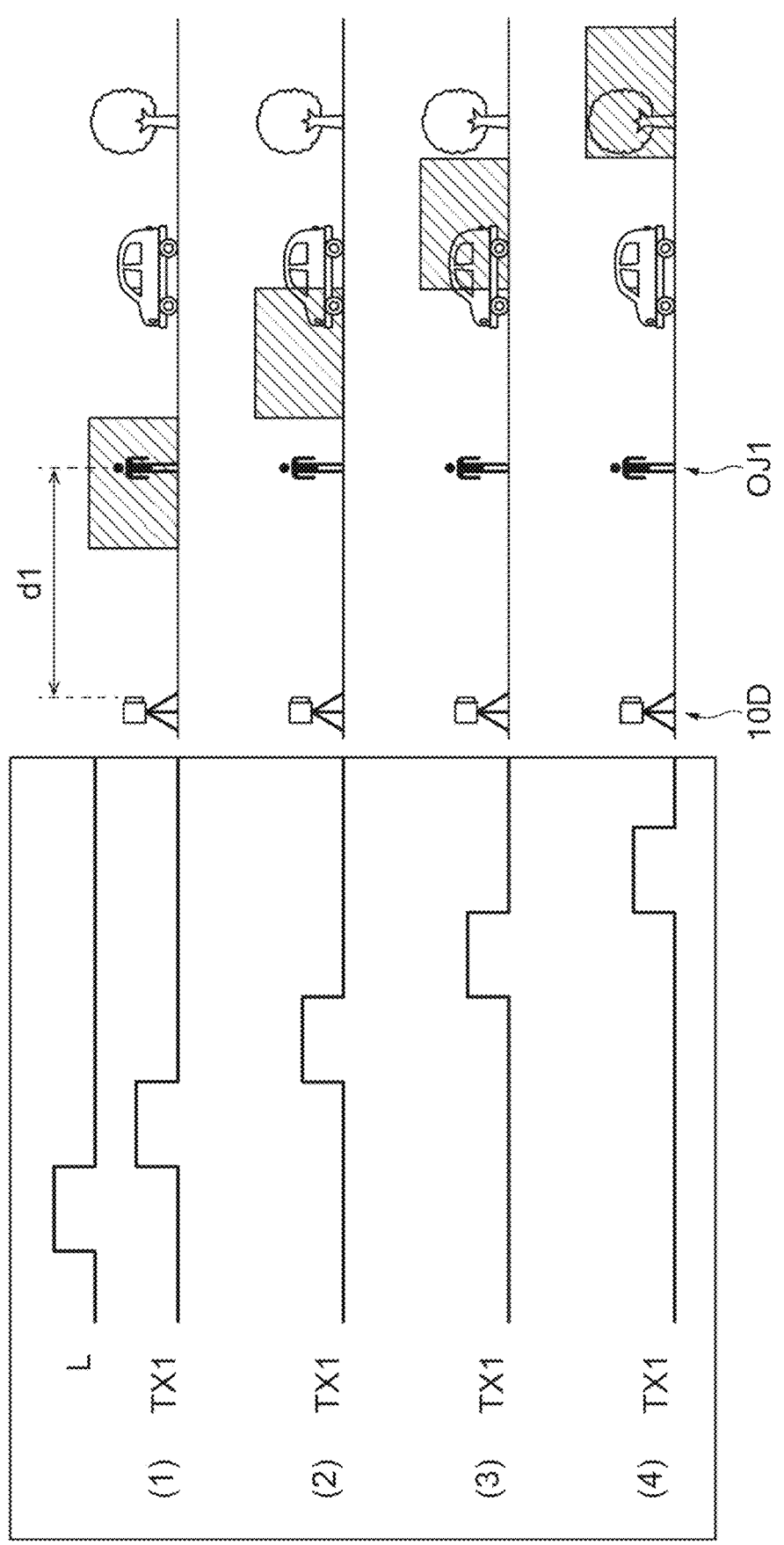
FIG. 17 is a diagram for explaining a gating function of the light detection device according to the second embodiment.

The gating function that can be realized by the above operation will be described with reference to FIG. 17. As in the example of (1) shown in FIG. 17, when the pulsed light L reflected in the vicinity of the object OJ1 away from the image sensor 10D by a distance d1 is detected, a voltage signal having a phase shifted by an amount corresponding to the distance d1 is applied to the first transfer gate electrode TX1. Therefore, in a period during which the pulsed light L reflected in the vicinity of the object OJ1 (that is, a range away from the image sensor 10D by a predetermined distance) is incident on the charge generation region 24, the first charge transfer process for transferring the charge generated in the charge generation region 24 to the first charge storage region P1 can be performed. As a result, it is possible to detect only the pulsed light L reflected in the vicinity of the object OJ1. Similarly, as in the examples of (2) to (4) shown in FIG. 17, when the pulsed light L reflected in a range away from the image sensor 10D by a predetermined distance is detected, a voltage signal having a phase shifted by an amount corresponding to the distance is applied to the first transfer gate electrode TX1. As described above, according to the light detection device 100, it is possible to realize the gating function for detecting only the light arriving at a predetermined timing. The gating function can be suitably used, for example, for measuring the fluorescence lifetime.

Functions and Effects of Second Embodiment

In the light detection device 100, the image sensor 10D has the first overflow region Q1 having a charge storage capacity larger than the charge storage capacity of the first charge storage region P1 and the first overflow gate electrode OV1 arranged on a region between the first charge storage region P1 and the first overflow region Q1. Therefore, since the charge overflowing from the first charge storage region P1 can be stored in the first overflow region Q1, it is possible to suppress the saturation of the storage capacity. In addition, during the execution of the first charge transfer process for transferring the charge generated in the charge generation region 24 to the first charge storage region P1, the potential energy $\phi_{OV1}$ of the region immediately below the first overflow gate electrode OV1 is lower than the potential energy $\phi_{PG}$ of the charge generation region 24. Therefore, even when the charge is stored in the first charge storage region P1 to the extent that the charge overflows into the first overflow region Q1, it is possible to suppress the charge from remaining in the charge generation region 24. Therefore, according to the light detection device 100, it is possible to improve the detection accuracy.

The control unit 4 performs the first read process after performing the first charge transfer process multiple times. In this manner, it is possible to improve the S/N ratio.

The charge generation region 24 includes the avalanche multiplication region 22. Therefore, since the avalanche multiplication can be caused in the charge generation region 24, it is possible to increase the detection sensitivity of the image sensor 10D. On the other hand, when the avalanche multiplication region 22 is included in the charge generation region 24, the amount of charge generated is extremely large. However, even in this case, in the light detection device 100, it is possible to sufficiently suppress the saturation of the storage capacity, and it is possible to sufficiently suppress the charge from remaining in the charge generation region 24.

The control unit 4 performs the second charge transfer process for transferring the charge stored in the first charge storage region P1 to the first overflow region Q1 and the second read process for reading the total amount of charge stored in the first charge storage region P1 and the first overflow region Q1. Therefore, not only is the amount of charge stored in the first charge storage region P1 read in the first read process, but also the total amount of charge stored in the first charge storage region P1 and the first overflow region Q1 is read in the second read process. As a result, it is possible to improve the charge amount detection accuracy.

The control unit 4 performs an unnecessary charge transfer process for transferring the charge generated in the charge generation region 24 to the unnecessary charge discharge region R by using the unnecessary charge transfer gate electrode RG in a period other than the period during which the first charge transfer process is performed. Therefore, since the charge generated in the charge generation region 24 can be transferred to the unnecessary charge discharge region R in a period other than the period during which the first charge transfer process is performed, it is possible to further suppress the charge from remaining in the charge generation region 24. The unnecessary charge transfer process is particularly useful in an environment in which there is a lot of ambient light.

The control unit 4 performs the first charge transfer process in a period during which the pulsed light L reflected by the object OJ is incident on the charge generation region 24. Therefore, it is possible to accurately detect the amount of charge generated in the charge generation region 24 in the period during which the pulsed light L reflected by the object OJ is incident on the charge generation region 24.

Modification Examples of Second Embodiment

Figure 18:
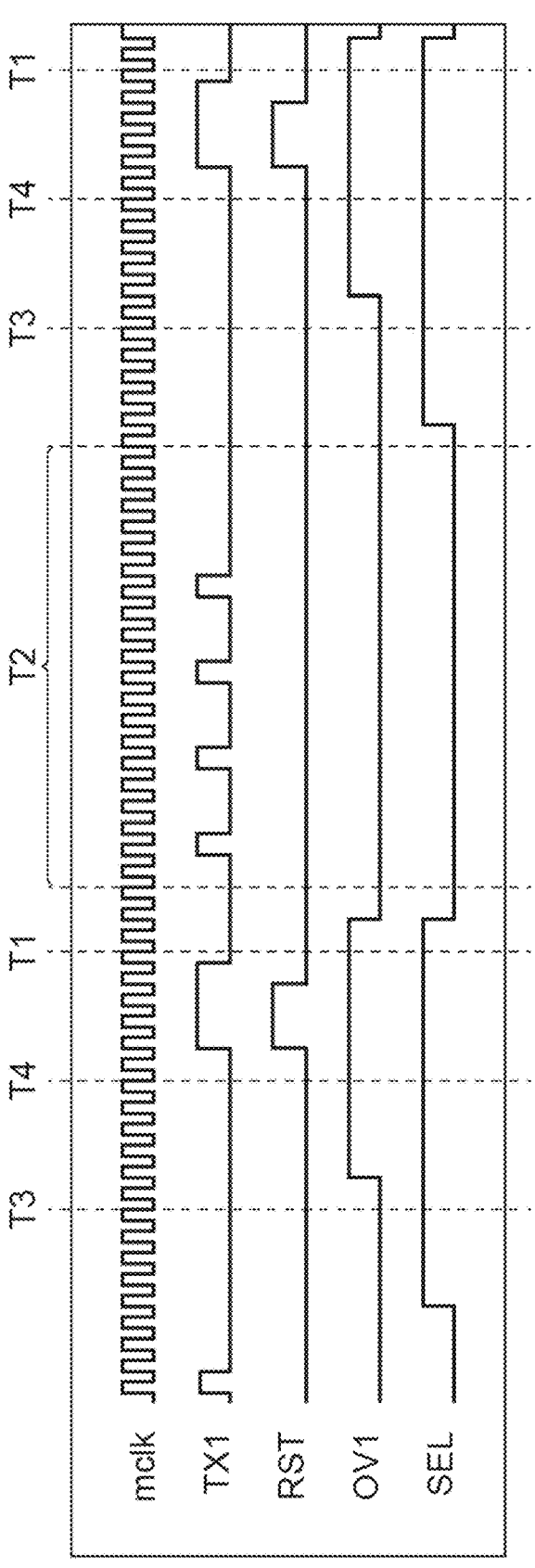
FIG. 18 is a timing chart showing an operation example of an image sensor according to a modification example of the second embodiment.

As a modification example, in the image sensor 10D, the unnecessary charge discharge region R and the unnecessary charge transfer gate electrode RG may not be provided in each pixel unit 11. The image sensor of this modification example is driven, for example, as shown in FIG. 18. In this driving method, the unnecessary charge transfer process for transferring the charge generated in the charge generation region 24 to the unnecessary charge discharge region R is not performed. Also in this modification example, as in the second embodiment described above, it is possible to improve the detection accuracy by suppressing the saturation of the storage capacity and suppressing the charge from remaining in the charge generation region 24. The image sensor of this modification example can be suitably used, for example, when it is difficult for ambient light to be incident on the charge generation region 24 in a period other than the period during which the first charge transfer process is performed. As an example of such a case, for example, there is a case where light detection is performed in a dark room.

The present disclosure is not limited to the above-described embodiments and modification examples. For example, the material and shape of each component are not limited to the materials and shapes described above, and various materials and shapes can be adopted. In the distance measurement sensors 10A and 10C and the image sensor 10D, the charge transferred to the unnecessary charge discharge regions R and R1 to R4 may be stored and read without being discharged to the outside. That is, the unnecessary charge discharge regions R and R1 to R4 may function as charge storage regions. In this case, light (light that does not include distance information) other than signal light can be read and used.

The avalanche multiplication region 22 may not be formed in the semiconductor layer 20. That is, the charge generation region 24 may not include the avalanche multiplication region 22. At least one of the well region 31 and the barrier region 32 may not be formed in the semiconductor layer 20. The signal processing unit 3 may be omitted, and the control unit 4 may be directly connected to the distance measurement sensors 10A to 10C. The second charge transfer process and the second read process may not be performed. The first read process may be performed after the first charge transfer process is performed once.

In the distance measurement sensors 10A to 10C and the image sensor 10D, it is possible to make light incident on the semiconductor layer 20 from either the first side or the second side. For example, when light is incident on the semiconductor layer 20 from the second side, the counter electrode 50 may be formed of a material having conductivity and light transmission (for example, polysilicon). In any of the distance measurement sensors 10A to 10C and the image sensor 10D, the p-type and n-type conductive types may be the opposite of those described above. In any of the distance measurement sensors 10A to 10C and the image sensor 10D, the plurality of pixels 11a may be aligned in a one-dimensional manner along the first surface 20a of the semiconductor layer 20. Each of the distance measurement sensors 10A to 10C and the image sensor 10D may have only a single pixel 11a. The charge storage capacity of the first overflow region Q1 may be equal to or less than the charge storage capacity of the first charge storage region P1.

The charge storage capacity of the second overflow region Q2 may be equal to or less than the charge storage capacity of the second charge storage region P2.

REFERENCE SIGNS LIST

1: distance measurement device (light detection device), 100: light detection device, 2: light source, 4: control unit, 10A, 10B, 10C: distance measurement sensor (image sensor, photosensor), 10D: image sensor (photosensor), 22: avalanche multiplication region, 24: charge generation region, P1: first charge storage region, P2: second charge storage region, P3: third charge storage region, P4: fourth charge storage region, Q1: first overflow region, Q2: second overflow region, Q3: third overflow region, Q4: fourth overflow region, R, R1, R2, R3, R4: unnecessary charge discharge region, PG: photogate electrode, TX1: first transfer gate electrode, TX2: second transfer gate electrode, TX3: third transfer gate electrode, TX4: fourth transfer gate electrode, OV1: first overflow gate electrode, OV2: second overflow gate electrode, OV3: third overflow gate electrode, OV4: fourth overflow gate electrode, RG: unnecessary charge transfer gate electrode.

The invention claimed is:

1. A light detection device, comprising:
a photosensor; and
a control unit that controls the photosensor,
wherein the photosensor includes a charge generation region that generates charge in response to incident light, a charge storage region, an overflow region, a transfer gate electrode arranged on a region between the charge generation region and the charge storage region, and an overflow gate electrode arranged on a region between the charge storage region and the overflow region,
the control unit performs a first charge transfer process, which is for transferring charge generated in the charge generation region to the charge storage region by applying an electric potential to the transfer gate electrode so that a potential energy of a region immediately below the transfer gate electrode is lower than a potential energy of the charge generation region, and a first read process, which is for reading an amount of charge stored in the charge storage region after the first charge transfer process, and
in the first charge transfer process, an electric potential is applied to the overflow gate electrode so that a potential energy of a region immediately below the overflow gate electrode is lower than the potential energy of the charge generation region and higher than the potential energy of the region immediately below the transfer gate electrode.

2. The light detection device according to claim 1, wherein the control unit performs the first read process after performing the first charge transfer process multiple times.

3. The light detection device according to claim 1, wherein the charge generation region includes an avalanche multiplication region.

4. The light detection device according to claim 1, wherein the control unit performs a second charge transfer process, which is for transferring the charge stored in the charge storage region to the overflow region by applying an electric potential to the overflow gate electrode so that the potential energy of the region immediately below the overflow gate electrode is reduced after the first read process, and a second read process, which is for reading a total amount of charge stored in the charge storage region and the overflow region after the second charge transfer process.

5. The light detection device according to claim 1, wherein the photosensor further includes an unnecessary charge discharge region and an unnecessary charge transfer gate electrode arranged on a region between the charge generation region and the unnecessary charge discharge region, and the control unit performs an unnecessary charge transfer process for transferring the charge generated in the charge generation region to the unnecessary charge discharge region by applying an electric potential to the unnecessary charge transfer gate electrode so that a potential energy of a region immediately below the unnecessary charge transfer gate electrode is lower than the potential energy of the charge generation region in a period other than a period during which the first charge transfer process is performed.

6. The light detection device according to claim 1, further comprising:

a light source that emits detection light, wherein the control unit performs the first charge transfer process in a period during which reflected light of the detection light on an object is incident on the charge generation region.

7. The light detection device according to claim 1, further comprising:

a photogate electrode arranged on the charge generation region, wherein, in the first charge transfer process, the control unit applies an electric potential to the photogate electrode and the overflow gate electrode so that the potential energy of the region immediately below the transfer gate electrode is lower than the potential energy of the charge generation region and the potential energy of the region immediately below the overflow gate electrode is lower than the potential energy of the charge generation region.

8. The light detection device according to claim 1, wherein the overflow region has a charge storage capacity larger than a charge storage capacity of the charge storage region.

9. A method for driving a photosensor, wherein the photosensor includes a charge generation region that generates charge in response to incident light, a charge storage region, an overflow region, a transfer gate electrode arranged on a region between the charge generation region and the charge storage region, and an overflow gate electrode arranged on a region between the charge storage region and the overflow region, the method for driving the photosensor comprises:

a charge transfer step for transferring charge generated in the charge generation region to the charge storage region by applying an electric potential to the transfer gate electrode so that a potential energy of a region immediately below the transfer gate electrode is lower than a potential energy of the charge generation region; and a read step for reading an amount of charge stored in the charge storage region after the charge transfer step, and in the charge transfer step, an electric potential is applied to the overflow gate electrode so that a potential energy of a region immediately below the overflow gate electrode is lower than the potential energy of the charge generation region and higher than the potential energy of the region immediately below the transfer gate electrode.

* * * * *